US012792182B2

(12) United States Patent
Katayama

(10) Patent No.: US 12,792,182 B2
(45) Date of Patent: Nov. 10, 2026

(54) INFORMATION PROCESSING SYSTEM AND NON-TRANSITORY COMPUTER READABLE MEDIUM

(71) Applicant: FUJIFILM Business Innovation Corp., Tokyo (JP)

(72) Inventor: Natsuki Katayama, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/457,315

(22) Filed: Aug. 28, 2023

(65) Prior Publication Data

US 2024/0329777 A1 Oct. 3, 2024

(30) Foreign Application Priority Data

Mar. 28, 2023 (JP) ................................ 2023-052424

(51) Int. Cl.

*G06F 3/041* (2006.01)
*G06F 3/044* (2006.01)
*G06F 3/04842* (2022.01)
*G06F 3/04845* (2022.01)
*G06F 3/0488* (2022.01)

(52) U.S. Cl.

CPC ........ *G06F 3/0418* (2013.01); *G06F 3/04842* (2013.01); *G06F 3/04845* (2013.01); *G06F 3/0488* (2013.01); *G06F 3/044* (2013.01); *G06F 2203/04101* (2013.01)

(58) Field of Classification Search

CPC .. G06F 3/041; G06F 3/04842; G06F 3/04845; G06F 3/0488; G06F 3/044

See application file for complete search history.

(56) References Cited

U.S. PATENT DOCUMENTS

2006/0161870 A1* 7/2006 Hotelling .............. G06F 3/0412 715/863
2014/0253518 A1 9/2014 Takano et al.
2014/0375588 A1 12/2014 Takano et al.
2015/0077374 A1 3/2015 Takano et al.
2016/0291798 A1 10/2016 Takano et al.
2017/0228098 A1 8/2017 Takano et al.
2022/0113811 A1* 4/2022 Tanemura ............... G06F 3/044
2022/0407968 A1* 12/2022 Fukui ................. H04N 1/00397
2024/0019983 A1* 1/2024 Lu ......................... G06F 3/0488

FOREIGN PATENT DOCUMENTS

JP 2014174617 9/2014

* cited by examiner

*Primary Examiner* — Sardis F Azongha
(74) *Attorney, Agent, or Firm* — JCIPRNET

(57) ABSTRACT

An information processing system includes a processor configured to, when an object in a screen is to be operated with a target in a contactless manner, in response to detection of the target over a first area included in the screen and displaying the object, cause a second area having a different size from the first area to be displayed to confirm an operation to be performed on the object.

13 Claims, 24 Drawing Sheets

INFORMATION PROCESSING SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2023-052424 filed Mar. 28, 2023.

BACKGROUND

(i) Technical Field

The present disclosure relates to an information processing system and a non-transitory computer readable medium.

(ii) Related Art

Japanese Unexamined Patent Application Publication No. 2014-174617 discloses an electronic device including a planar display unit and a touch panel disposed to overlap the display unit and capable of detecting two-dimensional coordinates of an indicator on a surface of the display unit and a vertical distance from the indicator. A two-dimensional coordinate valid zone in which at least the two-dimensional coordinates are valid becomes narrower as the vertical distance becomes larger.

SUMMARY

Aspects of non-limiting embodiments of the present disclosure relate to prevention or reduction of the occurrence of erroneous operations on an object, compared to when an operation to be performed on the object is confirmed when a target used for contactless operation is detected over a first area that displays the object.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a processor configured to, when an object in a screen is to be operated with a target in a contactless manner, in response to detection of the target over a first area included in the screen and displaying the object, cause a second area having a different size from the first area to be displayed to confirm an operation to be performed on the object.

BRIEF DESCRIPTION OF THE DRAWINGS

Exemplary embodiments of the present disclosure will be described in detail based on the following figures, wherein.

DETAILED DESCRIPTION

First Exemplary Embodiment

The following describes an exemplary embodiment of the present disclosure in detail with reference to the drawings. Components and processes that have substantially the same operations and functions are assigned the same reference symbols throughout the drawings, and redundant descriptions thereof may be omitted. The drawings are merely presented in schematic form to allow a full understanding of the present disclosure. Therefore, the present disclosure is not limited to only the illustrated examples. In the present exemplary embodiment, descriptions of configurations that are not directly related to the present disclosure or are well known may be omitted.

Figure 1:
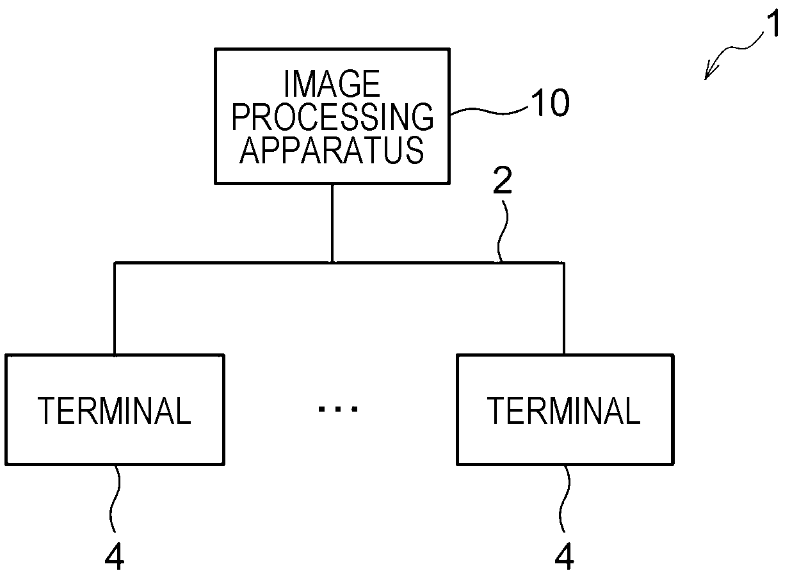
FIG. 1 is a diagram illustrating an example configuration of an information processing system including a contactless user interface through which a user performs an operation in a contactless manner.

FIG. 1 is a diagram illustrating an example configuration of an information processing system 1 including an information processing apparatus having a contactless user interface through which a user performs an operation in a contactless manner.

The information processing apparatus in the information processing system 1 may be applied to any field as long as the information processing apparatus includes a contactless user interface. Examples of the information processing apparatus include an image processing apparatus, an automatic teller machine (ATM), a vending machine, and an automatic ticket dispenser. The information processing apparatus may be for personal use only or usable by an unspecified number of users.

An image processing apparatus 10 installed in a workplace as an example of the information processing apparatus will be described hereinafter with reference to FIGS. 1 and 2.

Figure 2:
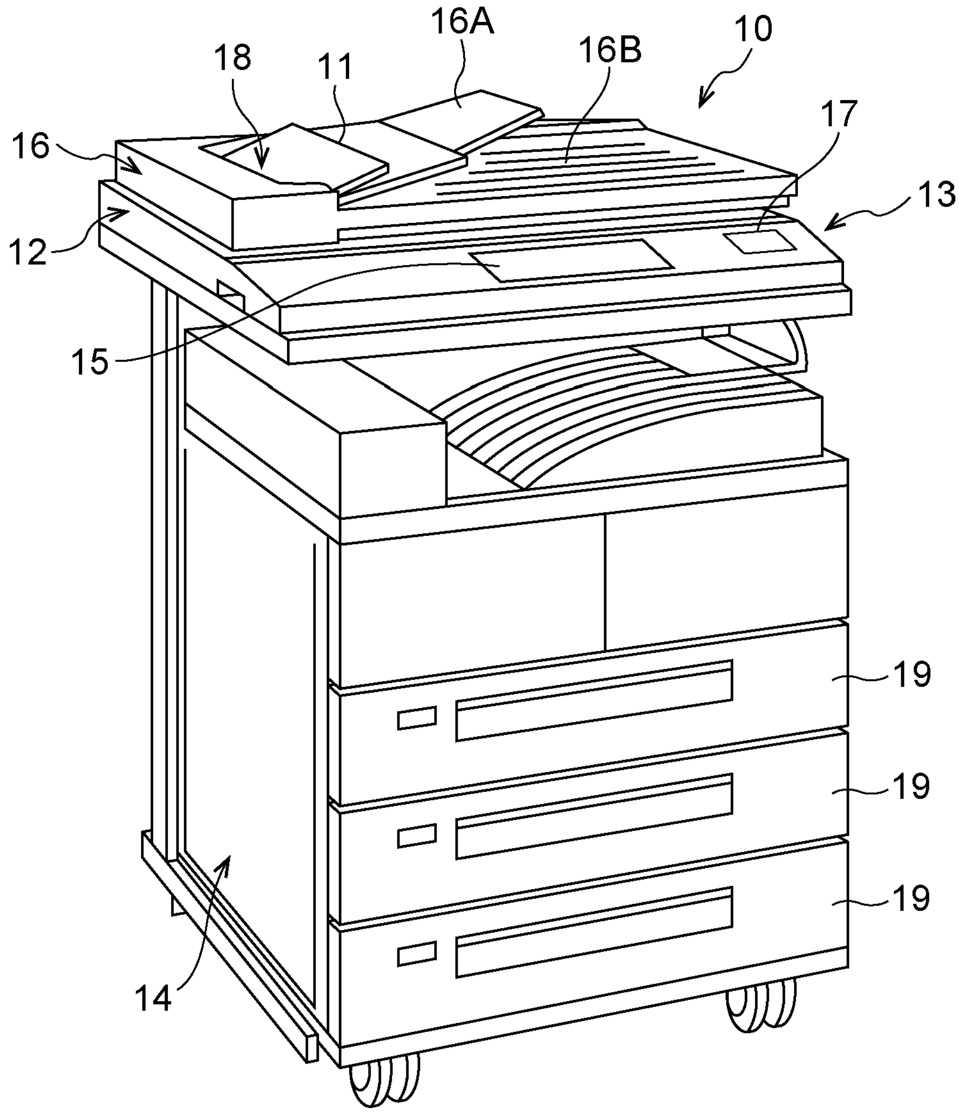
FIG. 2 is a perspective view of a substantial part of an image processing apparatus according to an exemplary embodiment.

FIG. 2 is a perspective view of a substantial part of the image processing apparatus 10 according to the present exemplary embodiment.

As described below, the image processing apparatus 10 is configured to execute functions related to images in accordance with instructions from users. The image processing apparatus 10 is connected to, for example, a plurality of terminals 4 to be used by individual users via a communication line 2.

Each user transmits image data generated by a corresponding one of the terminals 4 to the image processing apparatus 10 through the communication line 2 to cause the image processing apparatus 10 to execute desired image processing. Alternatively, a user may bring a portable storage medium such as a Universal Serial Bus (USB) memory or a memory card storing image data to the image processing apparatus 10 and connect the portable storage medium to the image processing apparatus 10 to cause the image processing apparatus 10 to execute desired image processing. Alternatively, a user may bring a document 11 having at least one of text or an image to the image processing apparatus 10 and make the image processing apparatus 10 read the document 11 to cause the image processing apparatus 10 to execute desired image processing.

The communication line 2 may be of any type that provides a connection between the image processing apparatus 10 and the terminals 4, such as a wired connection, a wireless connection, or a combination of wired and wireless connections. In addition, any number of terminals 4 may be connected to the image processing apparatus 10. For example, none of the terminals 4 may be connected to the image processing apparatus 10.

The terminals 4 are information devices configured to be used by users. The terminals 4 may be any type of information device having a data storage function and a data communication function. The terminals 4 include, for example, computers intended to be used at fixed positions, and mobile terminals intended to be transported and used, such as smartphones and wearable devices.

As illustrated in FIG. 2, the image processing apparatus 10 has, for example, a scan function for reading an image on a recording medium such as paper as image data, a print function for forming an image represented by image data on a recording medium, and a copy function for forming the same image as an image formed on a recording medium onto another recording medium. The copy function, the print function, and the scan function are examples of image processing to be performed by the image processing apparatus 10.

The image processing apparatus 10 illustrated in FIG. 2 includes, for example, a document reading device 12 in an upper portion thereof, and an image forming device 14 below the document reading device 12.

The document reading device 12 includes an optical reading device (not illustrated) and a document transport device 18. The document transport device 18 is disposed in a document cover 16. The document cover 16 is provided with a document table 16A, on which documents 11 are placed. The document transport device 18 sequentially feeds each of the documents 11 on the document table 16A and transports the document 11 onto a transported-document scanning glass (not illustrated). The document reading device 12 reads the content of the document 11 transported onto the transported-document scanning glass as image data using the optical reading device. Thereafter, the document transport device 18 discharges the document 11 whose content has been read onto a discharge table 16B included in the document cover 16.

The image forming device 14 forms an image represented by image data on a recording medium. Recording media are stored in storage trays 19 that are classified by the type or size of recording media. The image forming device 14 may form an image in any color on a recording medium and may form a color image or a monochrome image.

The image processing apparatus 10 includes, in a front portion thereof, an operation display device 13 that accepts an operation for executing various functions such as the copy function, the print function, and the scan function from a user.

Specifically, the operation display device 13 includes a reader device 17 that acquires information on a user who performs an operation, and an operation panel 15 that accepts an operation performed by the user.

For example, in response to the user bringing their employee identity card close to the reader device 17, the reader device 17 reads identification information (referred to as a "user ID") for uniquely identifying the user from an integrated circuit (IC) chip incorporated in the employee identity card in a contactless manner.

The operation panel 15 is a display having a touch panel superimposed thereon. The operation panel 15 displays, as an icon image, an object to be operated by the user to execute a desired function. The object may be of any type that is to be operated by the user, and includes, for example, a button, a scroll bar, a check box, and a radio button. In response to the user performing an operation on the object, the image processing apparatus 10 executes a process associated in advance with the content of the operation, and a response to the operation is displayed on the operation panel 15.

Figure 3A:
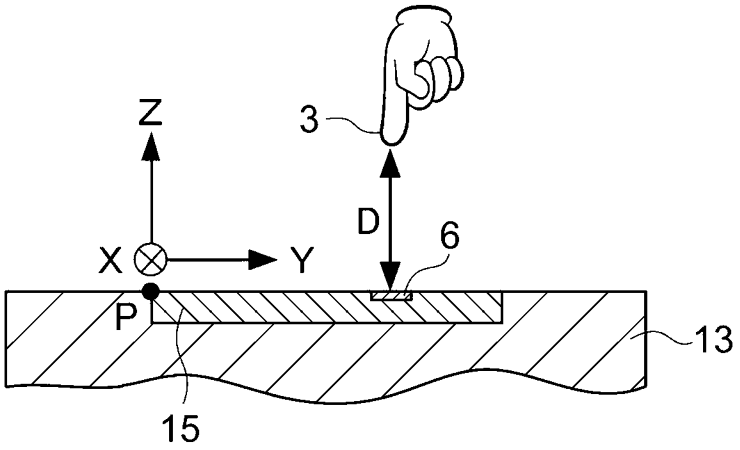
FIG. 3A is a sectional view of an operation panel.
Figure 3B:
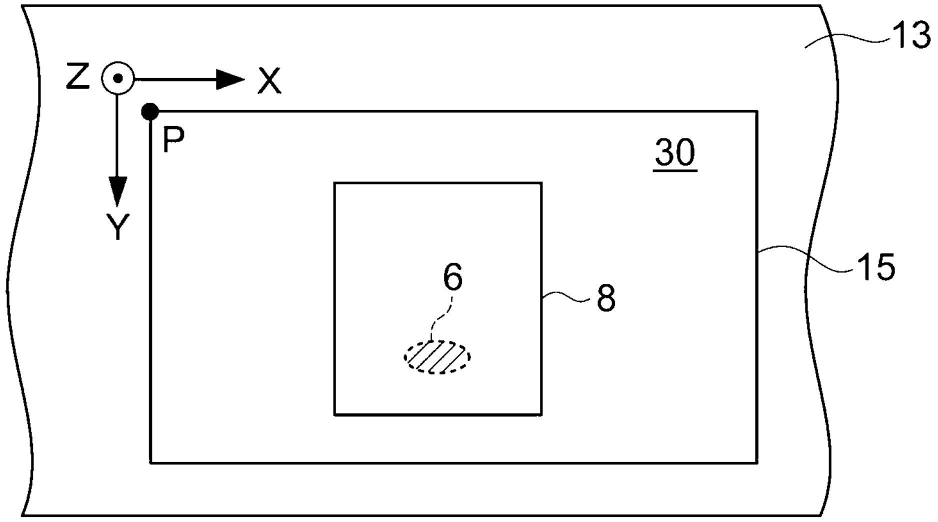
FIG. 3B is a plan view of the operation panel when viewed in a direction facing a display surface of the operation panel.

FIGS. 3A and 3B illustrate an example of the operation panel 15 that allows detection of an operation position 6 of the user in a contactless manner. FIG. 3A is a sectional view of the operation panel 15, and FIG. 3B is a plan view of the operation panel 15 when viewed in a direction facing a display surface of the operation panel 15.

The operation panel 15 detects the position of the user's finger, that is, the operation position 6, in a contactless manner. The phrase "detecting the operation position 6 in a contactless manner" refers to detecting the position of a user's finger in response to the user holding their finger in a position in mid-air that is above a display surface of the operation panel 15 and that is away from the display surface of the operation panel 15 in a range of the display surface of the operation panel 15 without pressing their finger against the display surface of the operation panel 15. A mid-air space above the display surface of the operation panel 15 in a range of the display surface of the operation panel 15 is hereinafter referred to as a mid-air space "over the operation panel 15" or "above the operation panel 15". The phrase "holding the user's finger over something (such as the operation panel 15)" means that the user points at a position in mid-air over the operation panel 15 with their finger without touching the display surface of the operation panel 15.

The operation panel 15 includes a so-called capacitive touch panel that detects the operation position 6 from a change in electrostatic capacitance caused by the user holding their finger over the operation panel 15. In the operation panel 15 including such a touch panel, a change in electrostatic capacitance at a position closest to the user's finger is larger than a change in electrostatic capacitance at any other position. Accordingly, the operation panel 15 outputs, as the operation position 6 of the user, a position at which the change in electrostatic capacitance is largest within the range of the operation panel 15.

To identify the operation position 6 of the user on the operation panel 15, an operation coordinate system is defined for the operation panel 15 to define a detection area for contactless detection of the position of the user's finger. The operation coordinate system is represented as a three-dimensional coordinate system having any position on the operation panel 15 as an origin P. In the example of the operation panel 15 illustrated in FIGS. 3A and 3B, the origin P is set at one of the vertices of the outline of the rectangular operation panel 15. In the example of the operation panel 15 illustrated in FIGS. 3A and 3B, furthermore, an X axis is set along a lateral direction of the operation panel 15 with respect to the origin P, a Y axis is set along a longitudinal direction of the operation panel 15 with respect to the origin P, and a Z axis is set so as to be orthogonal to the X and Y axes. The Z-axis direction is referred to as a height direction of the operation panel 15.

The operation position 6 of the user on the operation panel 15 is represented by a coordinate point (x, y), which is a combination of the coordinate value x of the X coordinate and the coordinate value y of the Y coordinate of a position at which the change in electrostatic capacitance is largest within the range of the operation panel 15.

When the operation panel 15 displays objects, an object displayed so as to include the operation position 6 of the user is recognized as the object being operated by the user. In the example of the operation panel 15 illustrated in FIG. 3B, since the operation position 6 of the user is included in the area of a button 8 in a screen 30 displayed on the operation panel 15, the user is recognized as operating the button 8. An object displayed so as to include the operation position 6 of the user may be hereinafter referred to as an "object corresponding to the operation position 6". The operation position 6 is an example of a "detected position at which an operation performed by a user has been detected" according to the present exemplary embodiment.

As illustrated in FIG. 3A, the length of a perpendicular drawn from a user's finger 3, which is held over the operation panel 15, to the display surface of the operation panel 15, that is, the distance from the user's finger 3 to the operation panel 15 in the height direction of the operation panel 15, is represented by an "operation distance D". The user's finger 3 is an example of a target with which the user performs operations. The target may be a body part of the user, other than the user's hand or fingers, or may be a stylus or any other tool owned by the user. As the operation distance D decreases, the change in electrostatic capacitance at the operation position 6 of the user increases on the operation panel 15. Conversely, as the operation distance D increases, the change in electrostatic capacitance at the operation position 6 of the user decreases on the operation panel 15. Accordingly, associating the operation distance D with the amount of change in electrostatic capacitance in advance makes it possible to obtain the operation distance D from the amount of change in electrostatic capacitance on the operation panel 15.

Based on the correspondence relationship between the operation distance D and the amount of change in electrostatic capacitance, the operation panel 15 recognizes the operation position 6 of the user not only as a two-dimensional operation position 6 along the display surface of the operation panel 15 but also as a three-dimensional operation position 6 that takes the operation distance D into account. That is, when the operation position 6 of the user is represented as a three-dimensional position, the operation position 6 of the user is represented by a coordinate point (x, y, z) obtained by combining a coordinate value z representing the operation position 6 in the height direction of the operation panel 15 with the coordinate point (x, y). The coordinate value z is a coordinate value, on the Z axis, of a position the operation distance D away from the origin P along the Z axis.

The coordinate value z=0 means that the user is performing an operation while touching the display surface of the operation panel 15 with their finger. Accordingly, the image processing apparatus 10 also recognizes a difference in the manner of the operation of the user, such as whether the user is operating the operation panel 15 in a contactless manner or operating the operation panel 15 with their finger in contact with the operation panel 15. As described above, the operation panel 15 supports both a contact operation in which the user performs an operation while touching the display surface of the operation panel 15 with their finger and a contactless operation in which the user operates the operation panel 15 while holding their finger over the operation panel 15.

As described above, since the change in electrostatic capacitance at the operation position 6 of the user decreases on the operation panel 15 as the operation distance D increases, the operation distance D has an upper limit. If the user holds their finger over the operation panel 15 at a position exceeding the upper limit of the operation distance D, the electrostatic capacitance at the operation position 6 of the user does not change, and the operation panel 15 makes no response to the operation of the user.

The detection area for objects is an area in mid-air that is about 3 cm away from the operation panel 15, for example. In other words, in response to the user moving the user's finger 3 close to a position about 3 cm from the operation panel 15, the electrostatic capacitance in the corresponding object changes and a contactless input is detected. The XYZ coordinates of the position in the detection area of the user's finger 3 are acquired as those of the operation position 6. In response to the user further moving the user's finger 3 to a position closer than 3 cm, the XYZ coordinates of the position are acquired.

Figure 4:
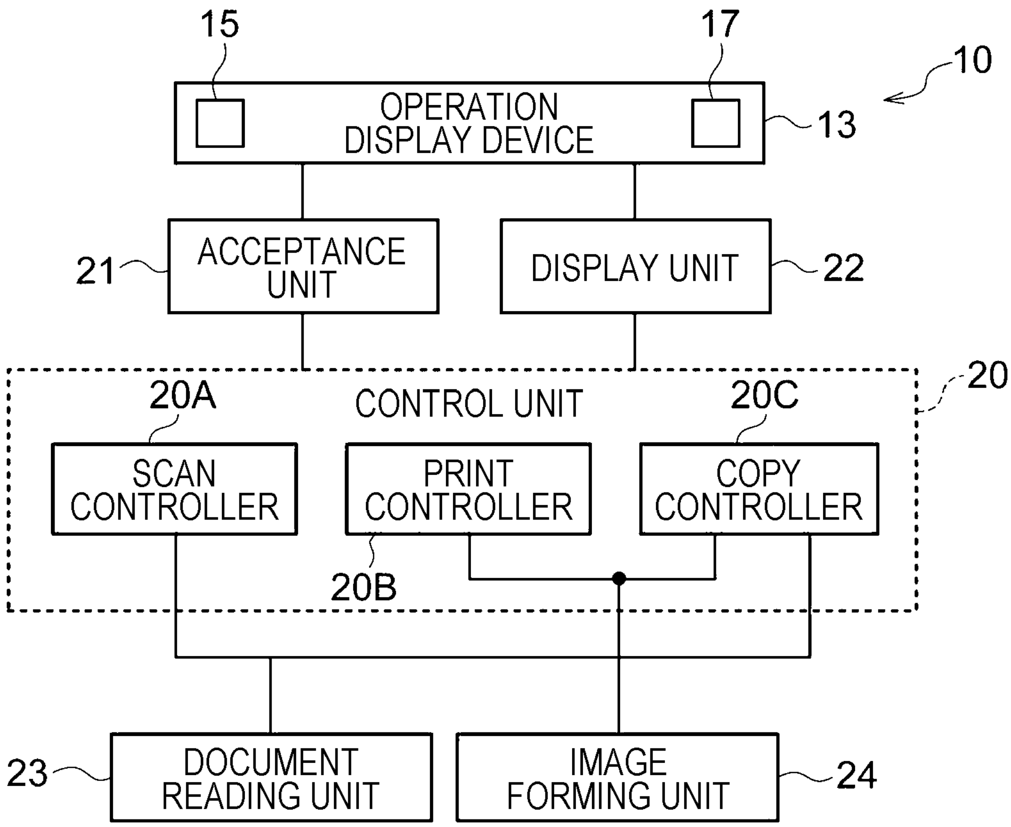
FIG. 4 is a diagram illustrating an example functional configuration of the image processing apparatus according to the exemplary embodiment.

FIG. 4 is a diagram illustrating an example functional configuration of the image processing apparatus 10 according to the present exemplary embodiment. The image processing apparatus 10 includes functional units, namely, a control unit 20, an acceptance unit 21, a display unit 22, a document reading unit 23, and an image forming unit 24.

The acceptance unit 21 accepts a user ID of a user who operates the image processing apparatus 10 from the reader device 17 of the operation display device 13, and also accepts the operation position 6 of the user on the operation panel 15 from the operation panel 15 of the operation display device 13. The acceptance unit 21 further accepts image data from a portable storage medium connected to the terminal 4 of the user or the image processing apparatus 10. The acceptance unit 21 notifies the control unit 20 of the user ID, the operation position 6 of the user, and the image data, which have been accepted.

When notified of the user ID by the acceptance unit 21, the control unit 20 performs an authentication process to determine whether the user represented by the user ID is a user (referred to as a "registered user") permitted to use the image processing apparatus 10. When notified of the operation position 6 of the user on the operation panel 15 by the acceptance unit 21, the control unit 20 determines whether the object displayed at the operation position 6 of the user is selected in the screen 30 displayed on the operation panel 15, and executes a process associated in advance with the selected object. For example, if the object is a button 8 for starting the print function, the control unit 20 starts the print function to form an image represented by the image data accepted by the acceptance unit 21 on a recording medium.

Since the image processing apparatus 10 has the copy function, the print function, and the scan function, the control unit 20 includes a scan controller 20A that controls the scan function, a print controller 20B that controls the print function, and a copy controller 20C that controls the copy function. Any one of the scan controller 20A, the print controller 20B, and the copy controller 20C performs control in accordance with the content of the process associated with the object operated by the user. In one example, the image processing apparatus 10 may have a facsimile function. In this example, the control unit 20 includes a facsimile controller that controls the facsimile function.

When the operation performed by the user through the object is an operation related to the scan function, the scan controller 20A controls the document reading unit 23 to implement the scan function. When the operation performed by the user through the object is an operation related to the print function, the print controller 20B controls the image forming unit 24 to implement the print function. When the operation performed by the user through the object is an operation related to the copy function, the copy controller 20C controls the document reading unit 23 to generate image data of the document 11. Thereafter, the copy controller 20C controls the image forming unit 24 to form an image represented by the generated image data on a recording medium.

The document reading unit 23 drives the document reading device 12 under the control of the scan controller 20A and the copy controller 20C to, for example, transport each of the documents 11 placed on the document table 16A and generate image data of the transported document 11.

The image forming unit 24 drives the image forming device 14 under the control of the print controller 20B and the copy controller 20C to, for example, transport a recording medium stored in any of the storage trays 19 and form an image represented by the image data on the transported recording medium.

The display unit 22 displays, for example, a result of the authentication process performed on the user and a result of the process executed by the control unit 20 in response to the operation performed by the user through the object on the operation panel 15 in the operation display device 13 in accordance with an instruction from the control unit 20.

Figure 5:
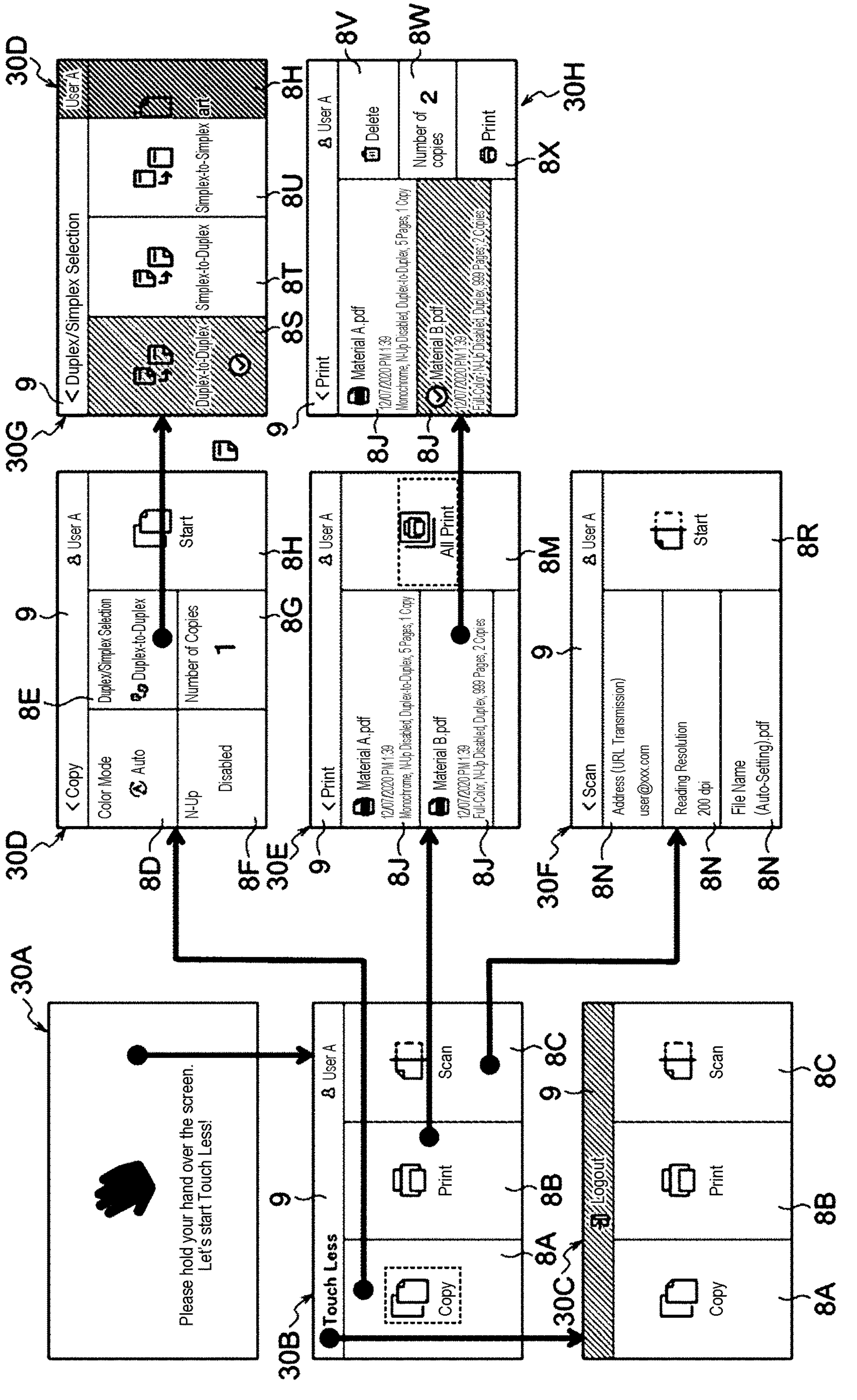
FIG. 5 is a diagram illustrating an example transition of a screen displayed on the operation panel, presenting how the screen transitions in response to the user operating the operation panel.
Figure 6:
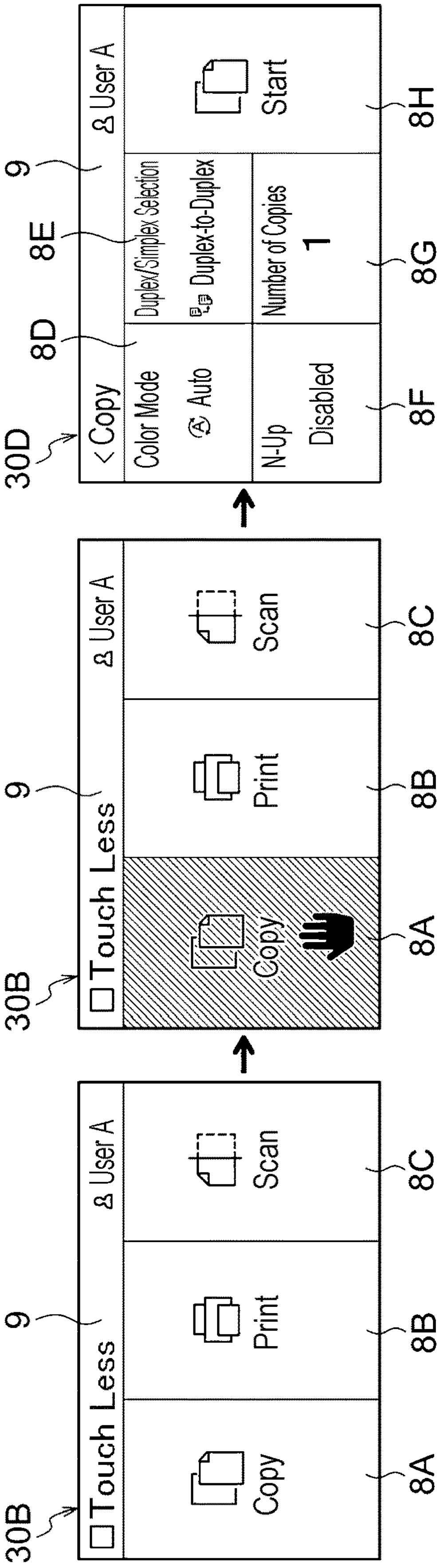
FIG. 6 is a diagram illustrating an example in which the user selects a "Copy" button, which is an example of an object, on a home screen.

FIG. 5 is a diagram illustrating an example transition of the screen 30 displayed on the operation panel 15, presenting how the screen 30 transitions in response to the user operating the operation panel 15.

The display of the screen 30 on the operation panel 15, which is performed by the display unit 22, may also be interpreted as the display of the screen 30 on the operation panel 15 under the control unit 20 because the display unit 22 displays the screen 30 in accordance with an instruction from the control unit 20. A mid-air space extending along the Z axis and having a bottom surface corresponding to the display range of the screen 30 displayed on the operation panel 15 is expressed as a mid-air space "over the screen 30" or "above the screen 30", and a mid-air space extending along the Z axis and having a bottom surface corresponding to the display range of an object displayed in the screen 30 is expressed as a mid-air space "over the object" or "above the object". Like the expression "over the operation panel 15" or "above the operation panel 15", the expression "over the screen 30" or "above the screen 30" and the expression "over the object" or "above the object" do not mean the upper side of the screen 30 and the upper side of the object based on the up, down, left, and right directions in the real space, respectively, but mean a mid-air space in a direction facing the screen 30 and a mid-air space in a direction facing the object, respectively.

For convenience of description, screens 30 whose types are distinguished from each other are accompanied by different alphabet symbols associated with the types of the screens 30. Screens 30 whose types are not distinguished from each other are collectively expressed as the "screens 30" regardless of their types. Buttons 8, which are an example of objects, whose types are distinguished from each other are accompanied by different alphabet symbols associated with the types of the buttons 8. Buttons 8 whose types are not distinguished from each other are collectively expressed as the "buttons 8" regardless of their types.

When it is determined that the user who performs an operation is a registered user through the authentication process, the control unit 20 causes a start screen 30A to be displayed on the operation panel 15. The start screen 30A displays an instruction given to the user, such as "Please hold your hand over the screen. Let's start Touch Less!", for example.

When the user holds their finger over the start screen 30A, a cursor is displayed at the operation position 6 of the user on the start screen 30A. In the example of the start screen 30A illustrated in FIG. 5, a cursor in the shape of a hand is displayed. The shape of the cursor is an example, and, for example, a circular cursor may be displayed. In response to the user holding their finger over the start screen 30A, a home screen 30B is displayed. The instruction given to the user in the start screen 30A is also used to instruct the user how to perform an operation on the operation panel 15.

The home screen 30B displays, for example, buttons 8 for individually selecting the various functions of the image processing apparatus 10, and a navigation bar 9 for displaying information useful for the user to perform an operation. Since the image processing apparatus 10 has the copy function, the print function, and the scan function, a "Copy" button 8A for selecting the copy function, a "Print" button 8B for selecting the print function, and a "Scan" button 8C for selecting the scan function are displayed on the home screen 30B. The navigation bar 9 displays, for example, the name of a user who has been authenticated, such as "user A", the name of a screen being displayed on the operation panel 15, such as "home", and information for notifying the user that the operation panel 15 is in a contactless operation mode, such as "Touch Less".

In response to the user holding their finger over the "Copy" button 8A, the "Copy" button 8A is selected. Upon selection of the "Copy" button 8A, a copy screen 30D is displayed on the operation panel 15. The copy screen 30D displays buttons 8D to 8G for setting copy conditions, and a copy start button 8H for starting copying under the set copy conditions.

The copy screen 30D illustrated in FIG. 5 displays, as an example of the buttons 8 for setting copy conditions, for example, a color mode button 8D for selecting a copy color, a duplex/simplex selection button 8E for selecting a double-sided (duplex) or single-sided (simplex) copy mode, an N-up button 8F for selecting an image layout on a recording medium, and a number-of-copies button 8G for selecting the number of copies to be made.

In response to the user holding their finger over any one of the buttons 8D to 8G for setting the respective copy conditions, the button 8 corresponding to the operation position 6 of the user is selected, and the screen 30 for setting the copy condition corresponding to the selected button 8 is displayed. In response to the duplex/simplex selection button 8E being selected on the copy screen 30D, a duplex/simplex selection screen 30G for selecting a duplex or simplex copy mode is displayed on the operation panel 15 in such a manner as to be superimposed on the copy screen 30D.

The duplex/simplex selection screen 30G illustrated in FIG. 5 displays, for example, a duplex-to-duplex selection button 8S for sequentially copying two-sided documents 11 on both sides of recording media, a simplex-to-duplex selection button 8T for sequentially copying one-sided documents 11 having text and the like on either side thereof on both sides of recording media, and a simplex-to-simplex selection button 8U for sequentially copying one-sided documents 11 having text and the like on either side thereof on either side of recording media.

In response to the user holding their finger over any one of the buttons 8S to 8U on the duplex/simplex selection screen 30G, the button 8 corresponding to the operation position 6 of the user is selected, and a copy mode corresponding to the selected button 8 is set. In the example of the duplex/simplex selection screen 30G illustrated in FIG. 5, the duplex-to-duplex selection button 8S is selected by the user.

In response to a duplex or simplex copy mode being set on the duplex/simplex selection screen 30G, the copy screen 30D is displayed on the operation panel 15. After the setting of the copy mode, the copy mode selected on the duplex/simplex selection screen 30G is displayed in the duplex/simplex selection button 8E on the copy screen 30D.

In the example described above, the user selects the duplex/simplex selection button 8E on the copy screen 30D. Also in response to the user selecting any one of the color mode button 8D, the N-up button 8F, and the number-of-copies button 8G on the copy screen 30D, a selection screen for selecting a copy condition corresponding to the selected one of the buttons 8 is displayed on the operation panel 15 in a manner similar to that for the duplex/simplex selection screen 30G.

In response to the user holding their finger over the copy start button 8H on the copy screen 30D, the copy start button 8H is selected. Upon selection of the copy start button 8H, a copying process for copying the content of the documents 11 on recording media is executed in accordance with the set copy conditions. Before the setting of the copy conditions, the buttons 8D to 8G on the copy screen 30D display initially set copy conditions that are set in advance.

In response to the user holding their finger over the "Print" button 8B on the home screen 30B, the "Print" button 8B is selected. Upon selection of the "Print" button 8B, a print screen 30E is displayed on the operation panel 15.

The print screen 30E displays print information buttons 8J each for displaying information on a piece of image data to be used for printing, and an all-print start button 8M for starting printing of all of the pieces of image data corresponding to the respective print information buttons 8J. In the example of the print screen 30E illustrated in FIG. 5, the print screen 30E in which two pieces of image data to be used for printing are accepted is illustrated. That is, the print screen 30E displays a number of print information buttons 8J equal to the number of pieces of image data accepted as targets for printing from the user, each print information button 8J corresponding to a corresponding one of the pieces of image data.

If the number of pieces of image data is too large to display the corresponding print information buttons 8J in the print screen 30E at the same time, in response to the user performing a gesture of moving their finger in an upward/downward direction of the print information buttons 8J, the operation panel 15 detects the movement of the operation position 6 and scrolls the print information buttons 8J. As a result, the print information buttons 8J that are not displayed in the print screen 30E are displayed in the print screen 30E.

Each of the print information buttons 8J displays a file name of image data to be used for printing and print conditions set by the user in advance for the image data. For example, when the user transmits image data from the terminal 4 to the image processing apparatus 10, print conditions set by the user using the terminal 4 are displayed in the print information button 8J.

In response to the user holding their finger over the all-print start button 8M, the all-print start button 8M is selected. Upon selection of the all-print start button 8M, a printing process for printing images represented by image data on recording media is executed in accordance with the set print conditions.

In response to the user holding their finger over any one of the print information buttons 8J, the print information button 8J over which the finger is held is selected. Upon selection of any one of the print information buttons 8J, a print edit screen 30H is displayed on the operation panel 15. The print edit screen 30H illustrated in FIG. 5 is displayed, for example, in response to the user selecting the print information button 8J corresponding to the image data representing "Material B.pdf".

The print edit screen 30H displays, for example, a delete button 8V for deleting the image data corresponding to the selected print information button 8J, a change button 8W for changing a print condition of the image data corresponding to the selected print information button 8J, and an individual-print start button 8X for printing only the image data corresponding to the selected print information button 8J. The print edit screen 30H illustrated in FIG. 5 displays, as an example of the change button 8W, a change button 8W for changing the number of copies to be printed. The print edit screen 30H also displays, for example, a change button 8W (not illustrated) for changing any other print condition, such as the color of an image to be printed.

In response to the user holding their finger over the "Scan" button 8C on the home screen 30B, the "Scan" button 8C is selected. Upon selection of the "Scan" button 8C, a scan screen 30F is displayed on the operation panel 15.

The scan screen 30F displays scan setting buttons 8N for setting scan conditions, and a scan start button 8R for starting reading of the documents 11 in accordance with the set scan conditions.

In response to the user holding their finger over any one of the scan setting buttons 8N, the scan setting button 8N corresponding to the operation position 6 of the user is selected, and a selection screen (not illustrated) for selecting the scan condition corresponding to the selected scan setting button 8N is displayed. That is, the user sets each of the scan conditions associated with the scan setting buttons 8N in the same manner as the operation of setting the copy conditions through the copy screen 30D. In response to the user holding their finger over the scan start button 8R, the scan start button 8R is selected. Upon selection of the scan start button 8R, a scanning process for converting the content of the documents 11 into image data is executed in accordance with the set scan conditions.

In response to the user holding their finger over the navigation bar 9 on the home screen 30B, the navigation bar 9 is selected. Upon selection of the navigation bar 9, a logout process of the authenticated user is performed. Then, as illustrated in a screen 30C, and the navigation bar 9 displays an indication of completion of the logout process.

The foregoing describes an example in which any one of the buttons 8 is selected in response to the user holding their finger over the button 8. In a contactless operation, the user's finger, which is in contact with the operation panel 15, can move. If an object whose area includes the operation position 6 is simply set as an object selected by the user because the area includes the operation position 6, another object adjacent to the object that the user is intended to operate may be incorrectly selected if the user's finger unintentionally moves. In addition, the user may pass their finger over another object not to be operated while moving the finger to above the object to be operated, and the unintended object may be incorrectly selected.

Accordingly, for example, when the user holds their finger over an intended object, a second area having a different size from a first area that displays the object may be displayed to confirm an operation to be performed on the object. When the user further holds their finger over the second area, it is determined that the user has selected the intended object. The following describes the display of the second area smaller than the first area that displays the intended object. In the following description, an operation to be performed on the object is confirmed when a total detection time during which the finger is detected in the second area exceeds a predetermined selection confirmation time. The operation may be confirmed in response to the user holding their finger over the first area followed by the second area, regardless of the total detection time.

Figure 7:
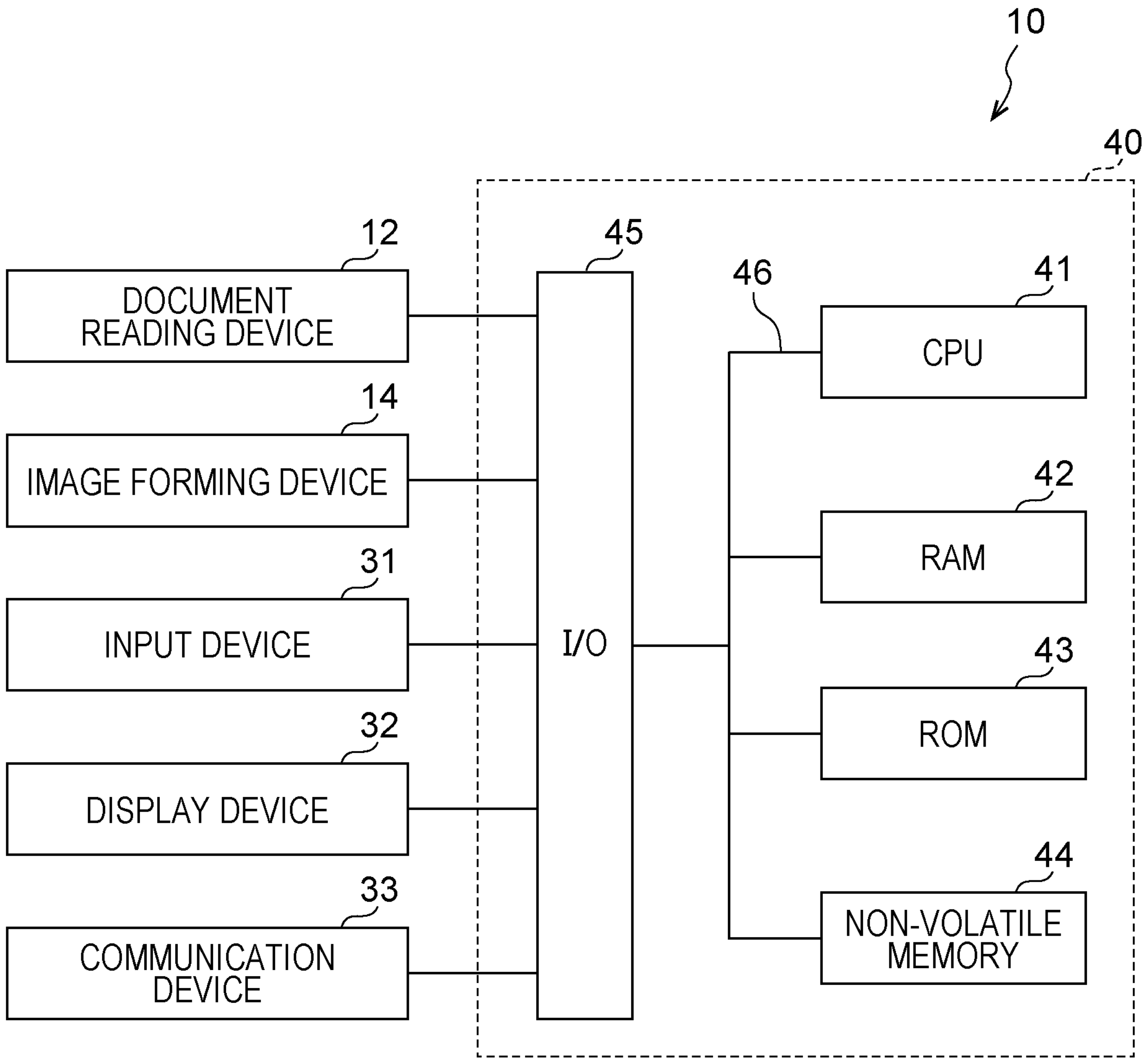
FIG. 7 is a block diagram illustrating an example configuration of a substantial part of an electrical system of the image processing apparatus according to the exemplary embodiment.

Next, the configuration of the substantial part of an electrical system of the image processing apparatus 10 will be described with reference to FIG. 7. The image processing apparatus 10 is implemented using, for example, a computer 40.

In the computer 40, a central processing unit (CPU) 41, a random access memory (RAM) 42, a read only memory (ROM) 43, a non-volatile memory 44, and an input/output interface (I/O) 45 are connected to each other via a bus 46.

The CPU 41 is an example of a processor configured to perform processing of the functional units of the image processing apparatus 10 illustrated in FIG. 4. The RAM 42 is an example of a storage medium to be used as a temporary work area for the CPU 41. The ROM 43 is an example of a storage medium that stores an information processing program to be executed by the CPU 41. The non-volatile memory 44 is an example of a storage medium configured such that information stored therein is maintained even if power supply to the non-volatile memory 44 is shut off. Examples of the non-volatile memory 44 include a semiconductor memory and a hard disk. The non-volatile memory 44 is not necessarily incorporated in the computer 40, and may be, for example, a storage medium attachable to the computer 40 in a removable manner, such as a memory card.

The I/O 45 is connected to, for example, the document reading device 12, the image forming device 14, an input device 31, a display device 32, and a communication device 33.

The document reading device 12 and the image forming device 14 are devices that perform operations as described above. The input device 31 is a device that notifies the CPU 41 of an instruction from the user and a user ID of the user in response to receipt of the instruction and the user ID. Examples of the input device 31 include a touch panel constituting the operation panel 15, and the reader device 17. The display device 32 is a device that visually displays information processed by the CPU 41. Examples of the display device 32 include a display constituting the operation panel 15. The communication device 33 is connected to the communication line 2 and has a communication protocol for communicating with the terminals 4. The devices connectable to the I/O 45 are not limited to the devices illustrated in FIG. 7. The I/O 45 may be connected to a device necessary for implementing a function in accordance with the functions of the image processing apparatus 10.

As described above, the image processing apparatus according to the first exemplary embodiment is configured such that, when an object in a screen is to be operated with a target in a contactless manner, in response to detection of the target over a first area included in the screen and displaying the object, a second area having a different size from the first area is displayed to confirm an operation to be performed on the object.

Figure 8:
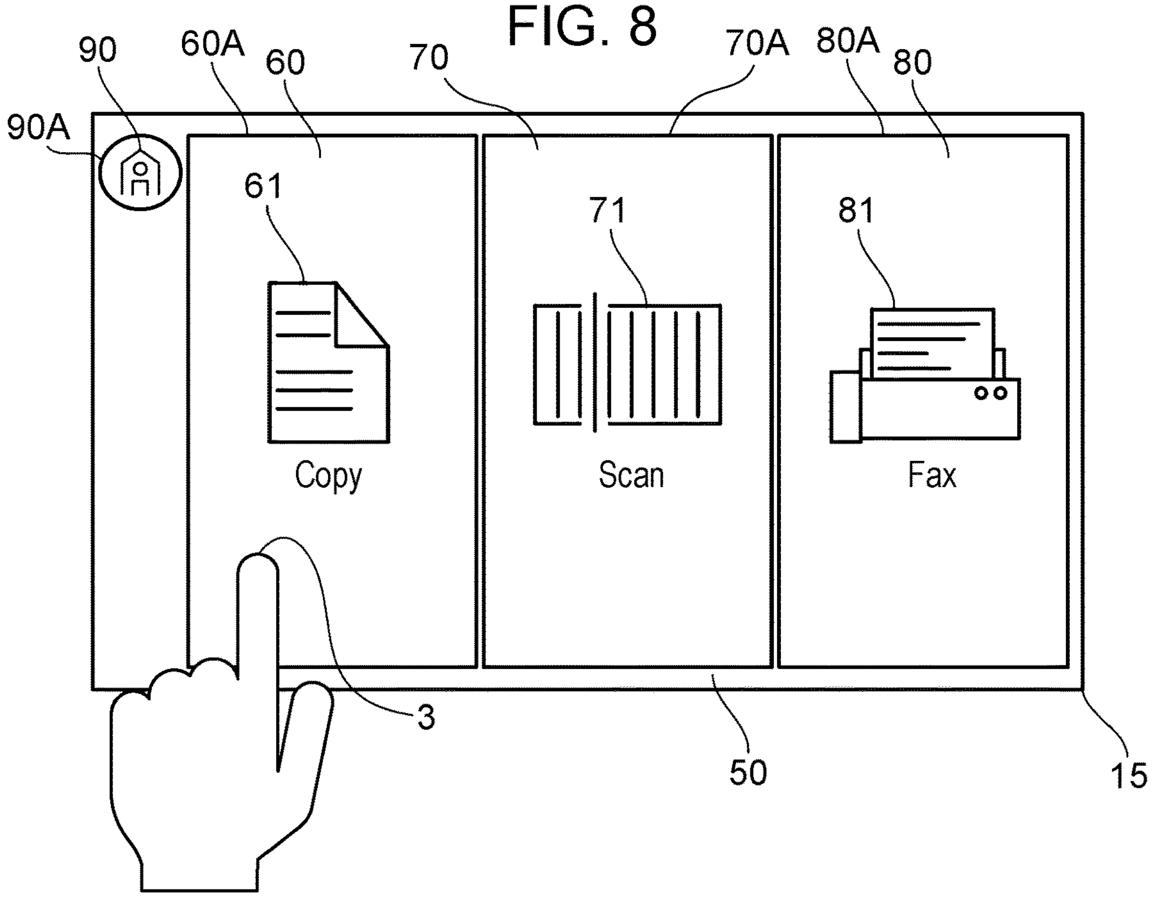
FIG. 8 is a front view of the home screen when the operation panel is viewed from the front.

More specifically, as illustrated in FIG. 8, in the image processing apparatus according to the present exemplary embodiment, the CPU 41 causes one or more objects to be displayed in a home screen 50 on the operation panel 15. In response to detecting the user's finger 3 over a first area included in the home screen 50 and displaying an object, the CPU 41 causes a second area having a different size from the first area to be displayed. The second area is an area for confirming an operation to be performed on the object. The operation to be performed on the object may be confirmed in response to detection of the user's finger 3 over the second area or detection of the user's finger 3 over the second area for a predetermined amount of time.

Next, the display of the home screen 50 as an example of a screen on the operation panel 15 will be described in detail with reference to FIG. 8. The home screen 50 is a screen having substantially the same functions as those of the home screen 30B described above.

FIG. 8 is a front view of the home screen 50 when the operation panel 15 is viewed from the front.

The home screen 50 illustrated in FIG. 8 displays a "Copy" button 60, a "Scan" button 70, a "Fax" button 80, and a home button 90 as an example of objects.

Like the "Copy" button 8A, the "Copy" button 60 is a button for selecting a copy function. An area that displays the "Copy" button 60 is referred to as a copy button area 60A. The copy button area 60A is referred to as the "button area 60A" for short, as appropriate. The button area 60A is an example of a first area in the present disclosure. The button area 60A has an icon image 61 to allow the user to recognize that the "Copy" button 60 has the copy function.

Like the "Scan" button 8C, the "Scan" button 70 is a button for selecting a scan function. An area that displays the "Scan" button 70 is referred to as a scan button area 70A. The scan button area 70A is an example of a first area in the present disclosure. The scan button area 70A has an icon image 71 to allow the user to recognize that the "Scan" button 70 has the scan function.

The "Fax" button 80 is a button for selecting a facsimile (fax) function. An area that displays the "Fax" button 80 is referred to as a fax button area 80A. The fax button area 80A is an example of a first area in the present disclosure. The fax button area 80A has an icon image 81 to allow the user to recognize that the "Fax" button 80 has the fax function.

The home button 90 is a button for executing a home function. An area that displays the home button 90 is referred to as a home button area 90A. The home button area 90A is an example of a first area in the present disclosure. The home button area 90A is referred to as the "button area 90A" for short, as appropriate. The home function is a function of returning the screen to the home screen illustrated in FIG. 8.

Next, an example of a contactless operation of the image processing apparatus 10 according to the first exemplary embodiment will be described with reference to FIGS. 9 to 15.

In the present exemplary embodiment, in response to detection of the user's finger 3 over a first area included in the home screen 50 and displaying an object, a second area is displayed to confirm an operation assigned to the object corresponding to the position at which the user's finger 3 is detected. That is, in the present exemplary embodiment, the selection operation is confirmed in the second area displayed in response to detection of the user's finger 3 over the first area.

Figure 9:
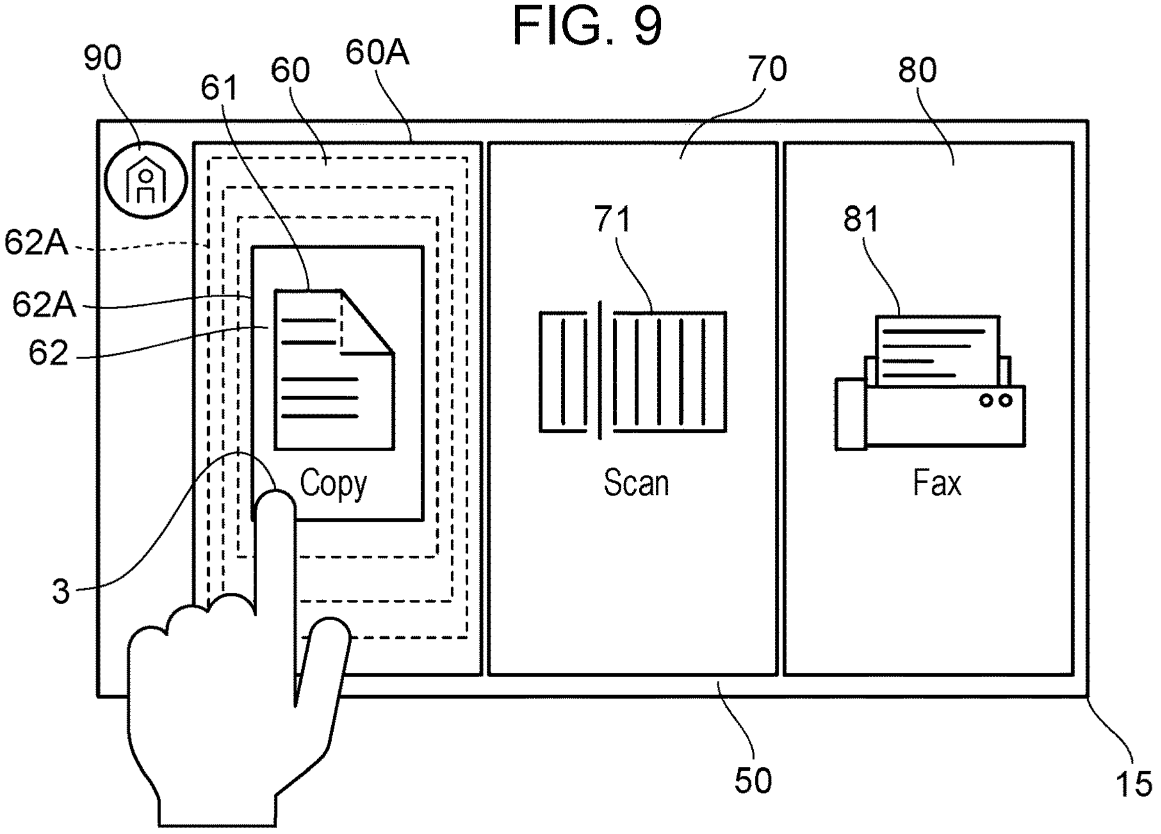
FIG. 9 is a front view of the home screen, illustrating a state in which a detection area that is an example of a second area of the object is reduced in size in response to detection of the user's finger.

First, an operation for selecting an object will be described with reference to FIG. 9. FIG. 9 is a front view of the home screen 50, illustrating a state in which a detection area 62 that is an example of a second area of an object is reduced in size in response to detection of the user's finger 3.

As illustrated in FIG. 9, in response to detection of the user's finger 3 over the button area 60A included in the home screen 50 and displaying the "Copy" button 60, the CPU 41 causes the detection area 62 having a different size from the button area 60A to be displayed in the home screen 50 to confirm the operation to be performed on the "Copy" button 60. As an example, the detection area 62 smaller than the button area 60A is displayed in the home screen 50.

As illustrated in FIG. 9, the CPU 41 may cause the detection area 62 to be displayed in the button area 60A. The CPU 41 may reduce the size of the detection area 62 to a predetermined size as the user's finger 3 approaches the detection area 62 in the home screen 50. That is, the detection area 62 may be reduced in size as the operation distance D (see FIG. 3A) between the user's finger 3 and the home screen 50 decreases. The detection area 62 may be displayed in color, or the boundary of the detection area 62 may be displayed as a line. This allows the user to easily recognize the reduction in the size of the detection area 62.

Further, the predetermined size of the detection area 62 may be any size that allows the user's finger 3 to remain above the detection area 62 in a contactless manner.

In response to detection of the user's finger 3 over the detection area 62 for a predetermined amount of time, the CPU 41 may confirm the operation to be performed on the "Copy" button 60. Specifically, the CPU 41 may confirm the operation assigned to the "Copy" button 60 (e.g., the selection operation) when the total detection time during which the user's finger 3 is detected over the detection area 62 exceeds a selection confirmation time determined in advance.

Figure 10:
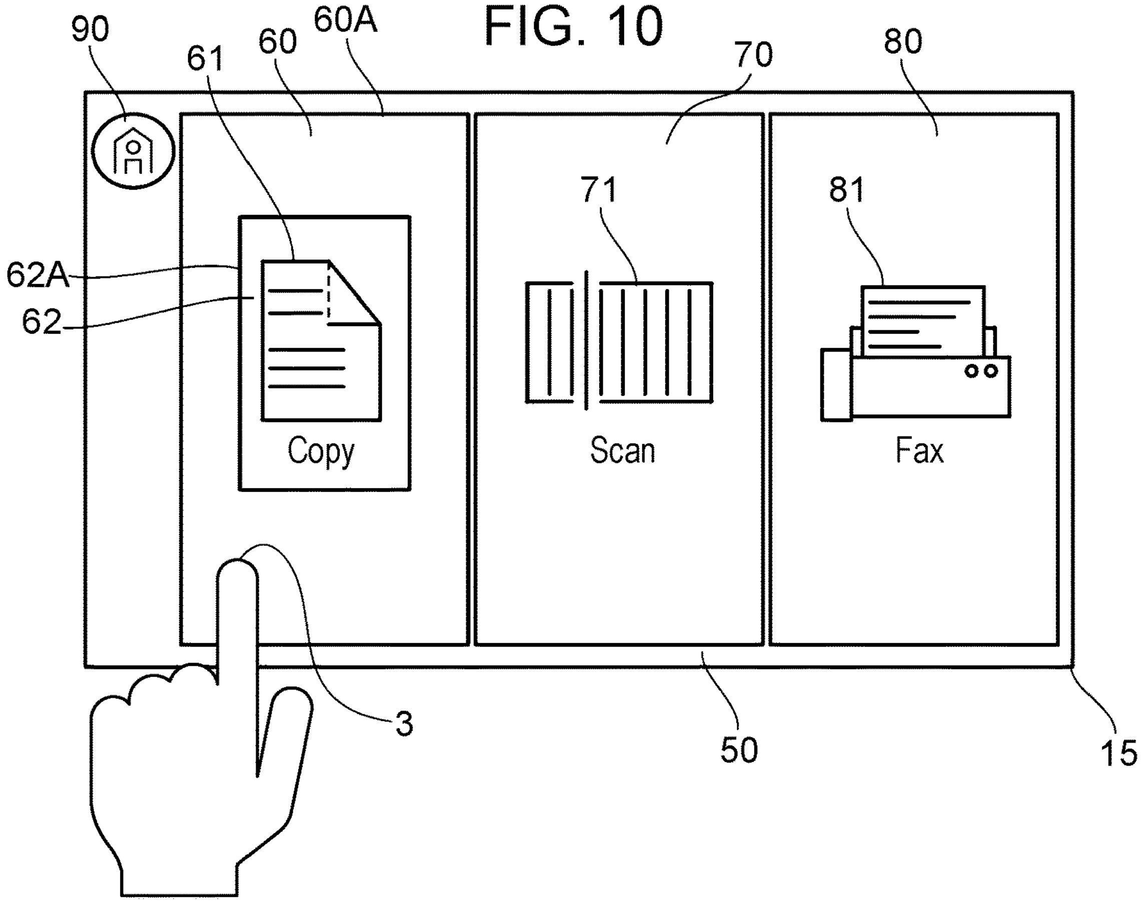
FIG. 10 is a front view of the home screen, illustrating a state in which the user's finger is pointing at a portion that is within a first area of the object and that is outside the second area.

As illustrated in FIG. 10, in response to detection of the user's finger 3 in a portion above the button area 60A and outside the detection area 62, the CPU 41 may suspend (or pause) the operation to be performed on the "Copy" button 60 without confirming the operation. Specifically, since the user's finger 3 is not present above the detection area 62, the total detection time does not exceed the selection confirmation time. For this reason, the CPU 41 may suspend the operation to be performed on the "Copy" button 60.

Figure 11:
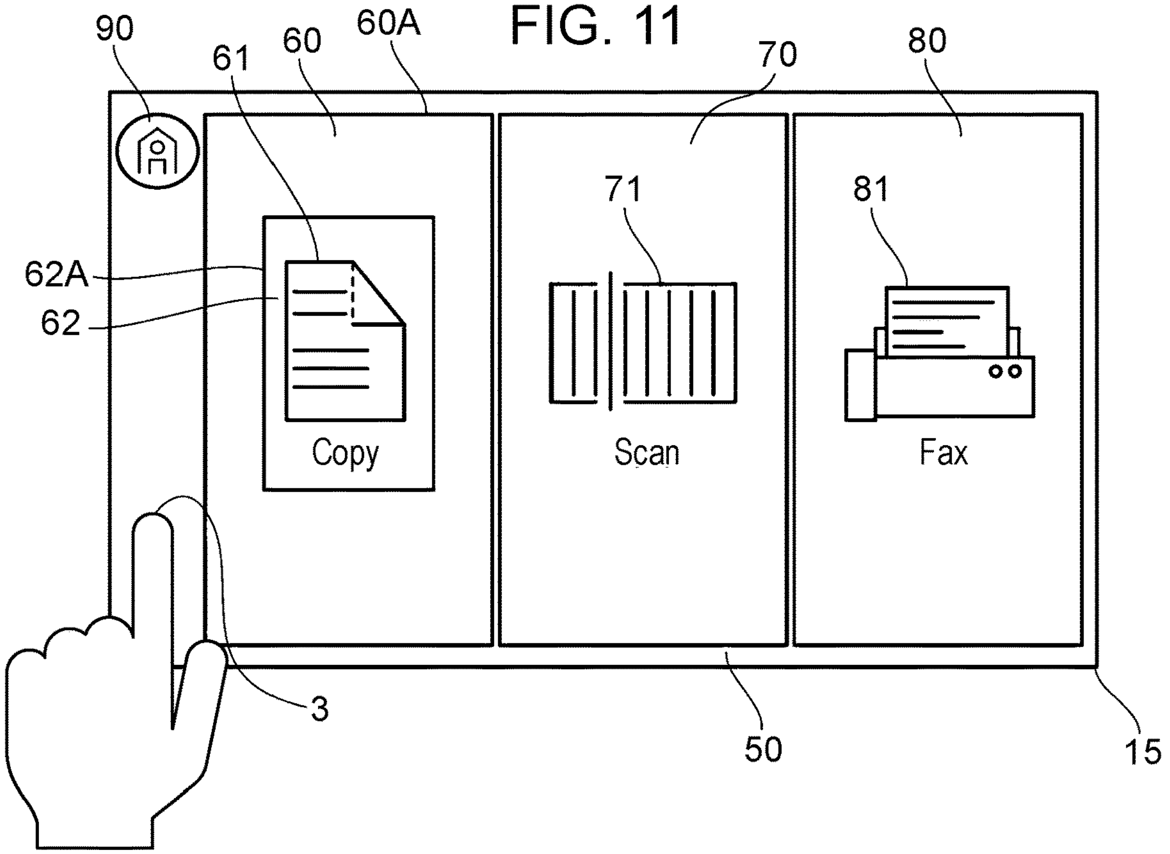
FIG. 11 is a front view of the home screen, illustrating a state in which the user's finger, which is detected over the first area of the object, is pointing at a portion outside the first area.

As illustrated in FIG. 11, in response to detection of the user's finger 3 outside the button area 60A, the CPU 41 may cancel the operation to be performed on the "Copy" button 60. The CPU 41 may also cancel the operation to be performed on the "Copy" button 60, when the user's finger 3 moves to the side of the home screen 50 and is located out of the detectable range or when the user's finger 3 moves away from the home screen 50 in the height direction.

Figure 12:
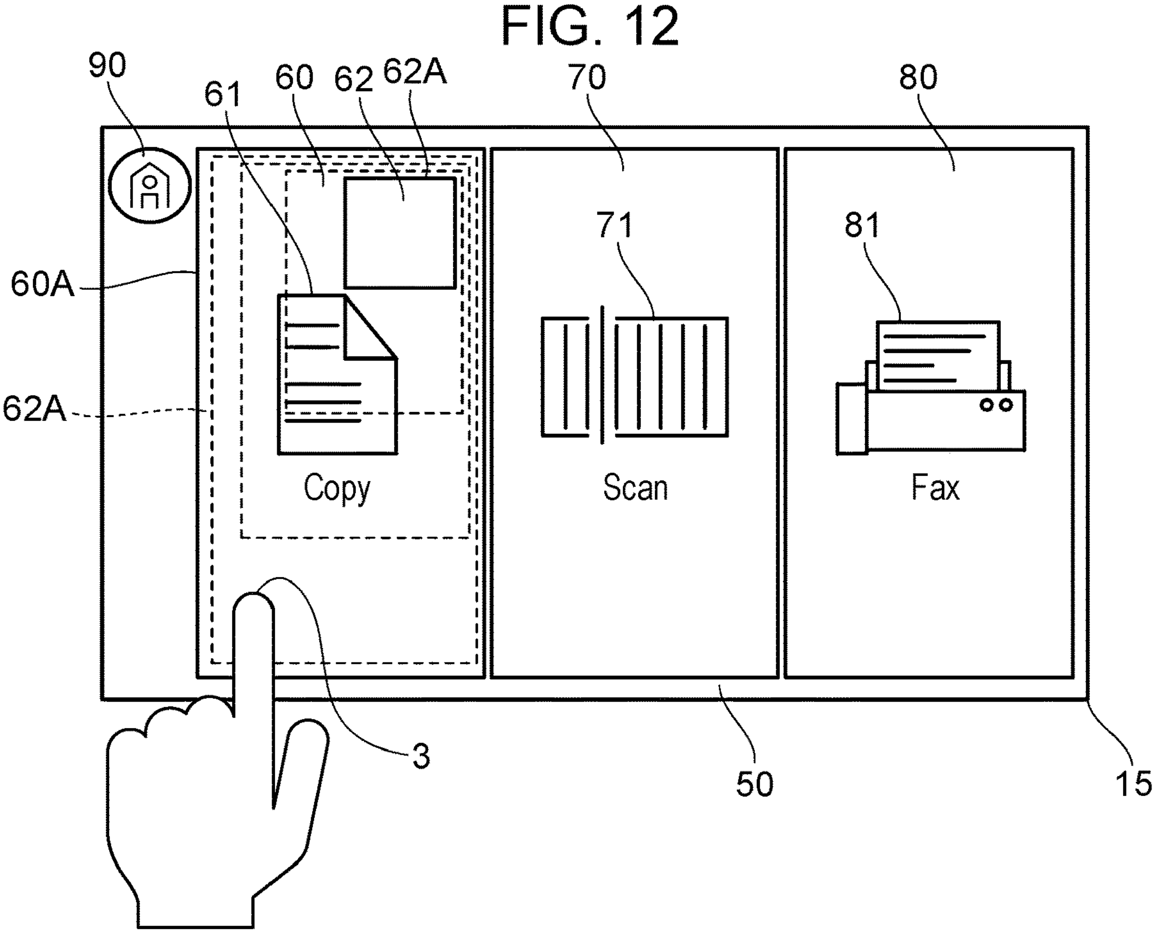
FIG. 12 is a front view of the home screen, illustrating a state in which a detection area that is an example of a second area of the object is reduced in size in response to detection of the user's finger.
Figure 13:
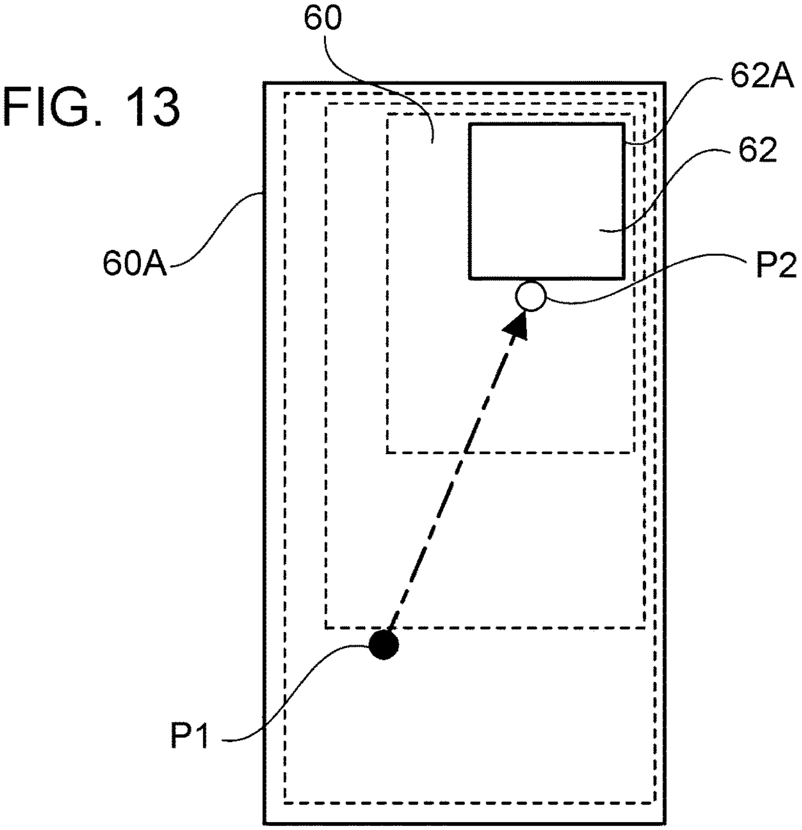
FIG. 13 is an enlarged view of the object illustrated in FIG. 12, illustrating a state in which the detection area, which is an example of the second area, is reduced in size from the coordinates of the position at which the user's finger is detected toward the coordinates of a position with point symmetry in the first area.

As illustrated in FIGS. 12 and 13, in response to detection of the user's finger 3 in the button area 60A, the CPU 41 may reduce the size of the detection area 62 toward a position P2 having point symmetry with respect to a detected position P1 of the user's finger 3 (in other words, the coordinates of the user's finger 3) as the user's finger 3 approaches the detection area 62. The detected position P1 and the position P2 are point symmetry with respect to the center of the button area 60A.

Figure 14:
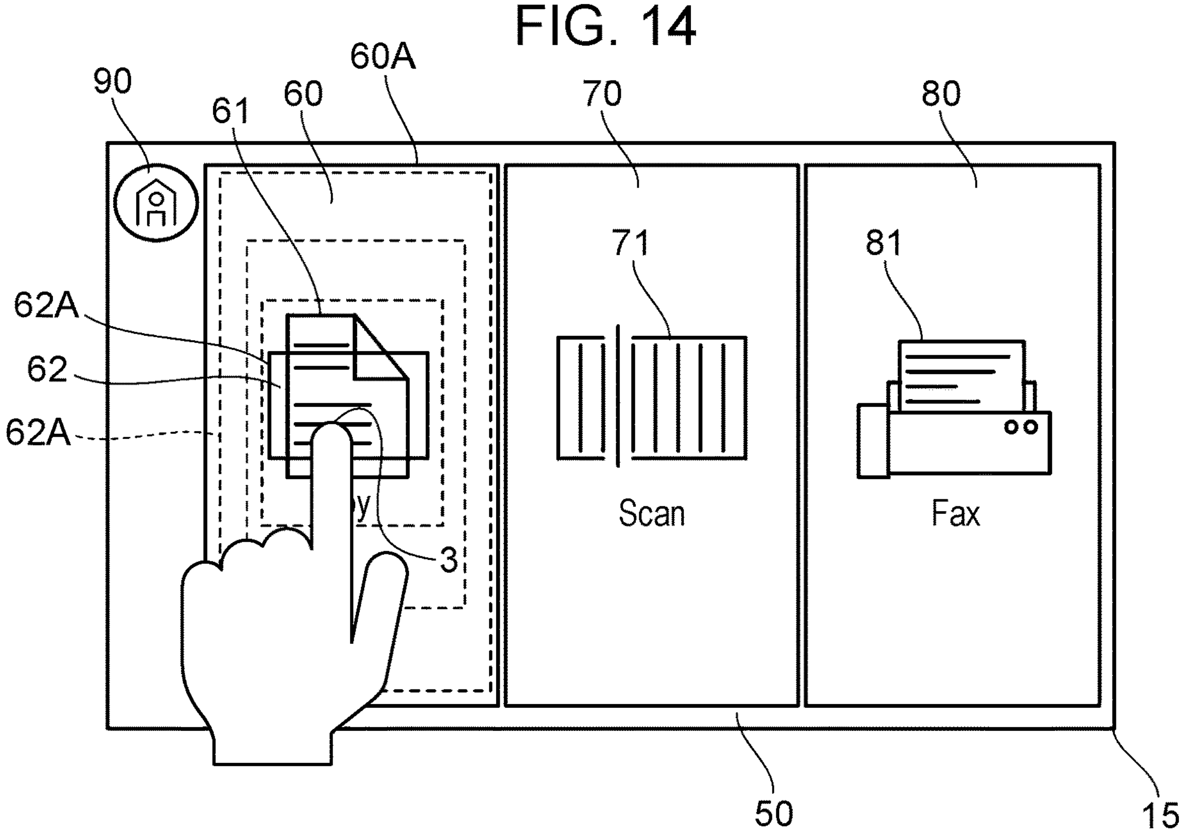
FIG. 14 is a front view of the home screen, illustrating a state in which a detection area that is an example of a second area of the object is reduced in size in response to detection of the user's finger.
Figure 15:
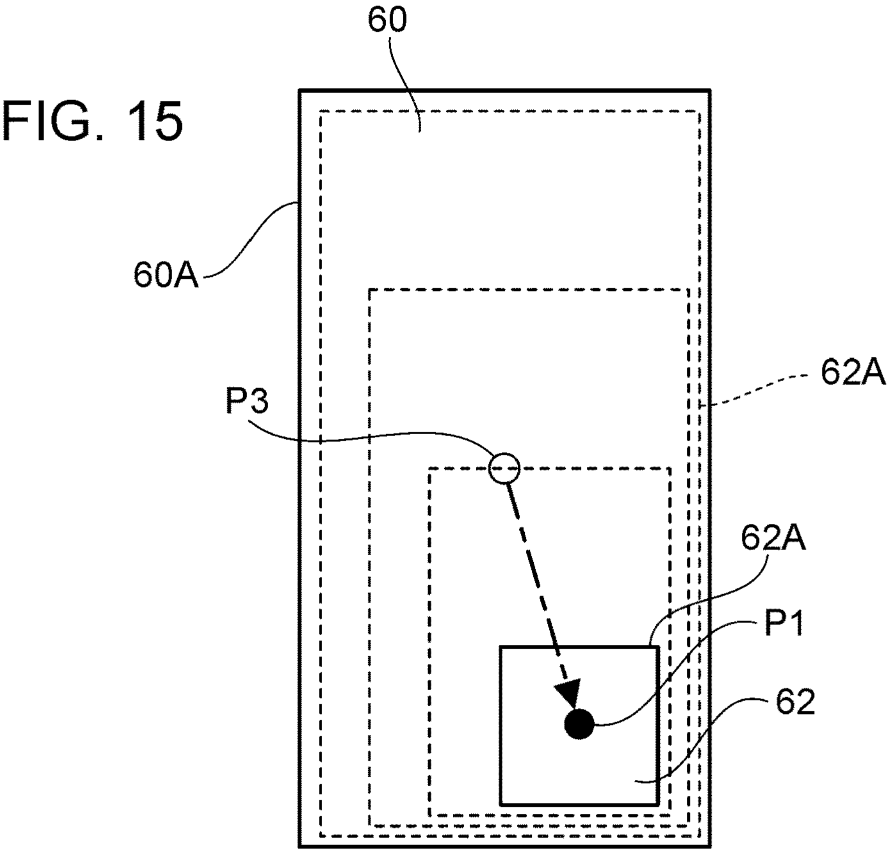
FIG. 15 is an enlarged view of the object illustrated in FIG. 14, illustrating a state in which the detection area, which is an example of the second area, is reduced in size toward the coordinates of the position at which the user's finger is detected in the first area.

As illustrated in FIG. 14, in response to detection of the user's finger 3 over a predetermined area in the button area 60A, the CPU 41 may reduce the size of the detection area 62 to a predetermined size centered on the predetermined area as the user's finger 3 approaches the detection area 62. The predetermined area in the copy button area 60A is, for example, an area located at the center of the copy button area 60A. That is, in the example illustrated in FIG. 14, since the user's finger 3 is detected over the area located at the center of the copy button area 60A, the CPU 41 reduces the size of the detection area 62 toward the center of the copy button area 60A. Accordingly, the total detection time increases even while the size of the detection area 62 decreases. In the example illustrated in FIG. 15, by contrast, the lower right of the copy button area 60A is designated as the predetermined area. Thus, in response to detection of the user's finger 3 over this area, the CPU 41 reduces the size of the detection area 62 toward this area.

Next, the operation of the image processing apparatus 10 according to the first exemplary embodiment will be described with reference to FIG. 26.

Figure 26:
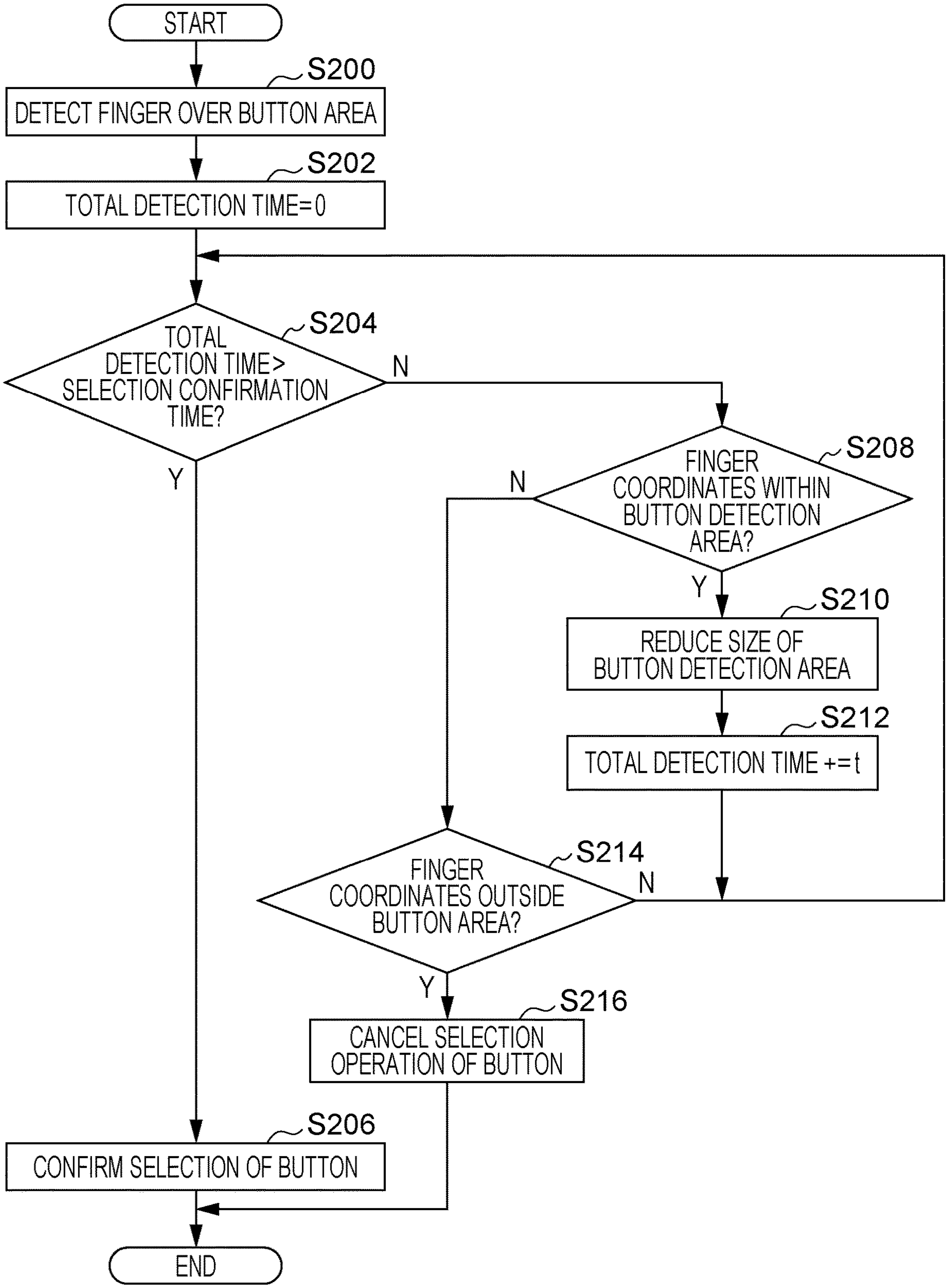
FIG. 26 is a flowchart illustrating an example of a process for contactless operation based on an information processing program according to the exemplary embodiment.

FIG. 26 is a flowchart illustrating an example of a process based on an information processing program according to the present exemplary embodiment.

First, in response to an instruction to execute a contactless input through the operation panel 15, the CPU 41 activates the information processing program and executes the steps described below.

Referring to FIG. 26, in step S200, the CPU 41 detects the user's finger 3, which is a target with which a contactless operation is to be performed, over the button area 60A. Then, the CPU 41 proceeds to step S202.

In step S202, the total detection time of the user's finger 3 for confirming the selection operation of the "Copy" button 60, which is an example of an object, is set to zero. After that, the CPU 41 proceeds to step S204.

In step S204, the CPU 41 compares the total detection time with the selection confirmation time. If the total detection time exceeds the selection confirmation time, the CPU 41 proceeds to step S206. On the other hand, if the total detection time is less than or equal to the selection confirmation time, the CPU 41 proceeds to step S208.

In step S206, the CPU 41 confirms the selection of the "Copy" button 60. After that, the CPU 41 proceeds to the next process corresponding to the selection of the "Copy" button 60.

In step S208, the CPU 41 determines whether the detected position of the user's finger 3 (also referred to as the coordinates of the user's finger 3) is within the detection area 62 of the "Copy" button 60. If the detected position of the user's finger 3 is within the detection area 62, the CPU 41 proceeds to step S210. On the other hand, if the detected position of the user's finger 3 is outside the detection area 62, the CPU 41 proceeds to step S214.

In step S210, the CPU 41 reduces the size of the detection area 62 in a predetermined direction. After the CPU 41 reduces the size of the detection area 62 to a predetermined size, the CPU 41 proceeds to step S212.

In step S212, the CPU 41 adds the time during which the user's finger 3 is detected over the detection area 62 to the total detection time. Then, the CPU 41 proceeds to step S204.

In step S214, the CPU 41 determines whether the detected position of the user's finger 3 is outside the button area 60A. If the detected position of the user's finger 3 is outside the button area 60A, the CPU 41 proceeds to step S216. On the other hand, if the detected position of the user's finger 3 is within the button area 60A, the CPU 41 proceeds to step S204.

In step S216, the CPU 41 cancels the selection operation of the "Copy" button 60.

In the first exemplary embodiment, first, the user's finger 3 is detected over the button area 60A, and the detection area 62 is displayed. Then, the user's finger 3 remains above the detection area 62 until the total detection time exceeds the selection confirmation time. As a result, the selection operation of the "Copy" button 60 is confirmed. In the first exemplary embodiment, even when the user's finger 3 is detected over the button area 60A, the detection area 62 is merely displayed without confirmation of the selection operation of the "Copy" button 60. Accordingly, the occurrence of erroneous operations on the "Copy" button 60 may be prevented or reduced compared to when the selection operation of the "Copy" button 60 is confirmed when the user's finger 3 is detected over the button area 60A. Further, when the user's finger 3 remains above the detection area 62 until the total detection time exceeds the selection confirmation time, the selection operation of the "Copy" button 60 is confirmed, thereby preventing or reducing the occurrence of erroneous operations on the "Copy" button 60. In the first exemplary embodiment, furthermore, the detection area 62 is displayed within the button area 60A, which allows the user to easily recognize that the detection area 62 is associated with the button area 60A, compared to when the detection area 62 is displayed outside the button area 60A.

Figure 27:
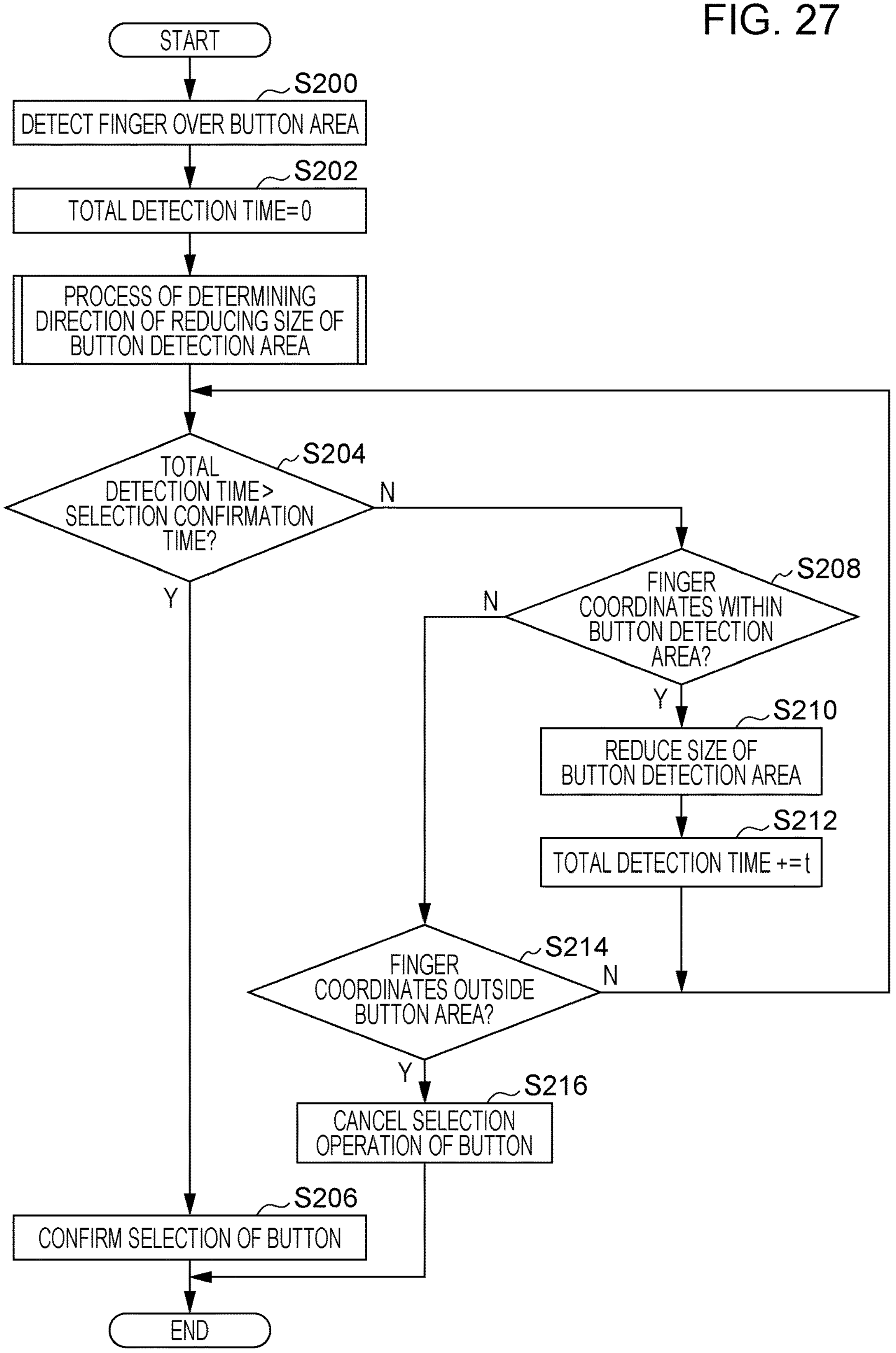
FIG. 27 is a flowchart illustrating a modification of the process for contactless operation based on the information processing program according to the exemplary embodiment.

In the information processing program according to the exemplary embodiment described above, the detection area 62 is reduced in size in a predetermined direction; however, the present disclosure is not limited to this configuration. As in a modification of the information processing program according to the first exemplary embodiment illustrated in FIGS. 27 to 29, a process of determining a direction of reducing the size of the detection area 62 and reducing the size of the detection area 62 in the determined direction may be added. The modification of the information processing program illustrated in FIG. 27 is the same as the information processing program illustrated in FIG. 26, except that the modification has a function of performing a process of determining a direction of reducing the size of the detection area 62 of the "Copy" button 60. Examples of the process of determining a direction of reducing the size of the detection area 62 include a process illustrated in FIG. 28 and a process illustrated in FIG. 29.

Figure 28:
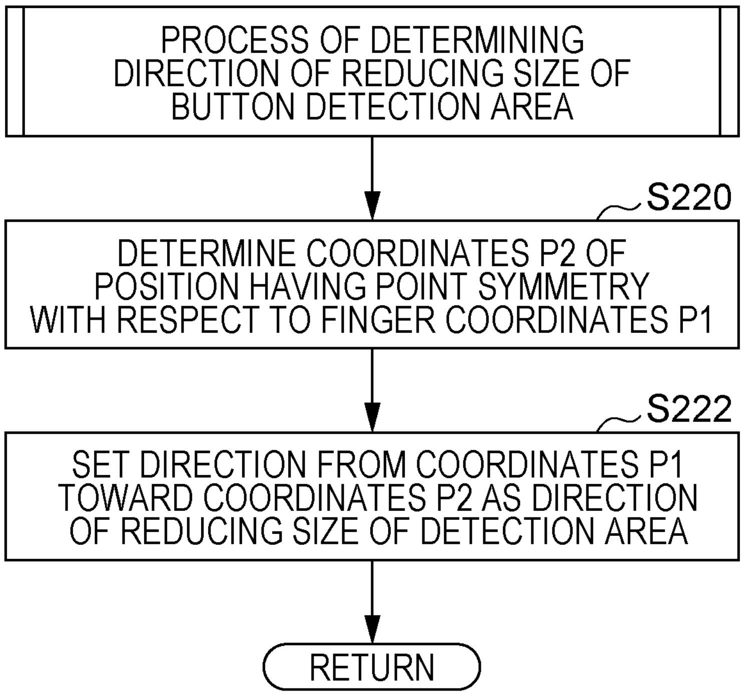
FIG. 28 is a flowchart illustrating an example of a process illustrated in FIG. 27 for determining a direction of reducing the size of a detection area (second area) of a button that is an example of the object.

In the process illustrated in FIG. 28, in step S220, the CPU 41 determines the coordinates of the position P2 having point symmetry with respect to the coordinates P1 of the user's finger 3. Then, in step S222, the CPU 41 sets a direction from the coordinates P1 toward the coordinates of the position P2 (see FIG. 13) as the direction of reducing the size of the detection area 62. After that, the CPU 41 proceeds (returns) to step S204 illustrated in FIG. 27.

Figure 29:
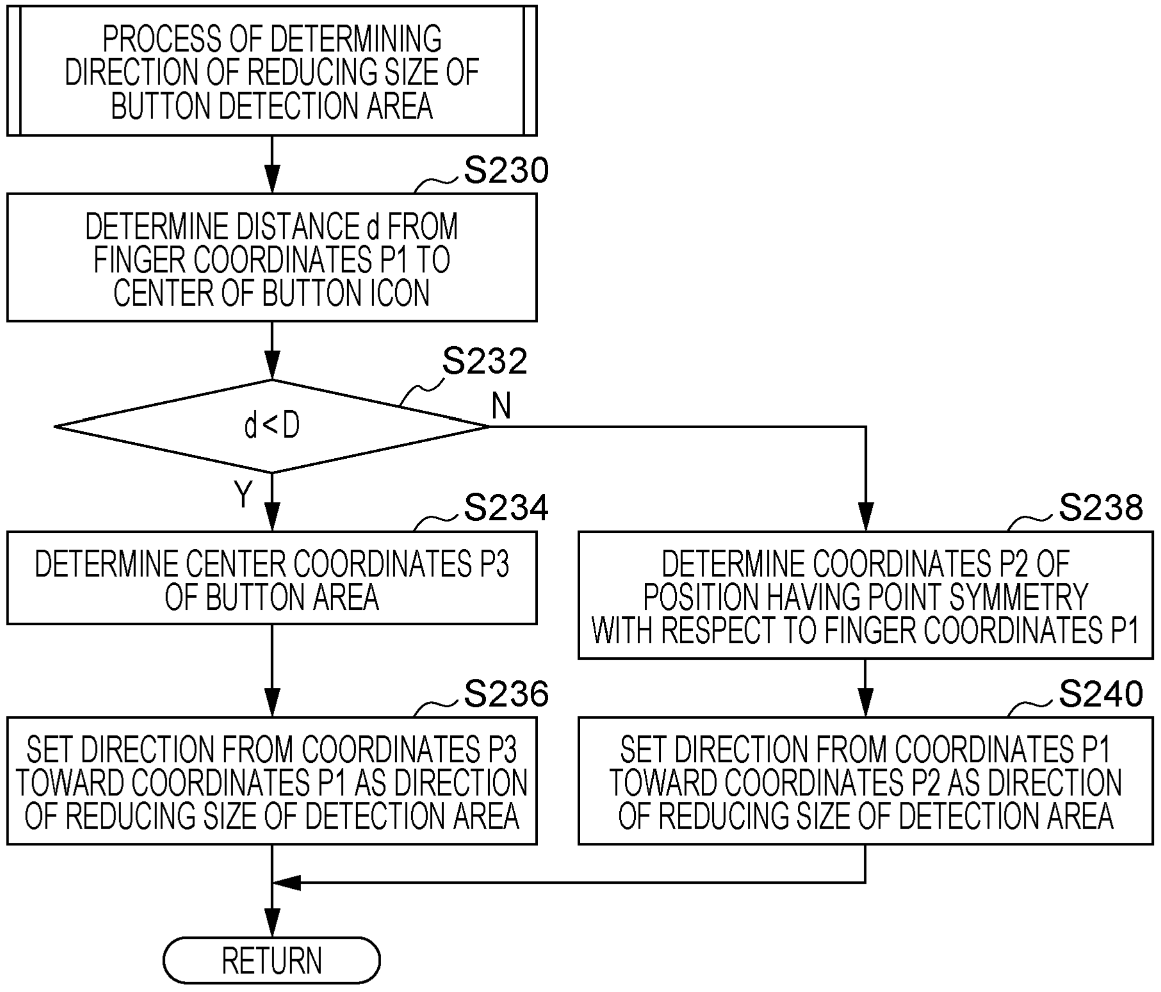
FIG. 29 is a flowchart illustrating an example of a process illustrated in FIG. 27 for determining a direction of reducing the size of a detection area (second area) of a button that is an example of the object.

In the process illustrated in FIG. 29, in step S230, the CPU 41 determines a distances d from the coordinates P1 of the user's finger 3 to the center of the icon image 61 of the "Copy" button 60. Then, in step S232, the CPU 41 compares the distance d with a radius D. The radius D is the radius of an area serving as a center portion of the icon image 61. If the distance d is smaller than the radius D, the CPU 41 proceeds to step S234. If the distance d is greater than or equal to the radius D, the CPU 41 proceeds to step S238. In step S234, the CPU 41 determines center coordinates P3 of the button area 60A. Then, in step S236, the CPU 41 sets a direction from the center coordinates P3 toward the coordinates P1 (see FIG. 15) as the direction of reducing the size of the detection area 62. After the processing of step S236 is completed, the CPU 41 proceeds (returns) to step S204 illustrated in FIG. 27.

The processing of step S238 is the same as the processing of step S220 in FIG. 28, and the processing of step S240 is the same as the processing of step S222 in FIG. 28. The description of the processing of steps S238 and S240 will thus be omitted.

In the example illustrated in FIGS. 12, 13, 27, and 28, in response to detection of the user's finger 3 over the button area 60A, the CPU 41 causes the detection area 62 to be displayed at a position that is located above the button area 60A and that does not include the detected position of the user's finger 3. Accordingly, the user moves the finger 3 to above the detection area 62 to confirm the selection operation of the "Copy" button 60. In other words, the selection operation of the "Copy" button 60 is not confirmed unless the user intentionally moves the finger 3 to above the detection area 62. As described above, in the example illustrated in FIGS. 12, 13, and 28, the occurrence of erroneous operations on the "Copy" button 60 may be prevented or reduced compared to when the CPU 41 causes the detection area 62 to be displayed at a position that is located above the button area 60A and that includes the detected position of the user's finger 3 in response to detection of the user's finger 3 over the button area 60A.

In the example illustrated in FIGS. 14, 15, 27, and 29 (the process including the processing of steps S234 and S236), in response to detection of the user's finger 3 over a predetermined area in the button area 60A (a center portion of the button area 60A in FIG. 14 and a corner portion of the button area 60A in FIG. 15), the CPU 41 reduces the size of the detection area 62 to a predetermined size centered on the predetermined area as the user's finger 3 approaches the detection area 62 in the home screen 50. That is, in response to detection of the user's finger 3 in a predetermined area in the button area 60A, for example, in the center portion of the button area 60A, the CPU 41 determines that the user intentionally selects the "Copy" button 60, and reduces the size of the detection area 62 toward the coordinates P3 (detected position) of the user's finger 3. Since the time taken to reduce the size of the detection area 62 is also included in the detection time of the user's finger 3, the total detection time early exceeds the selection confirmation time. As described above, the operation to be performed on the "Copy" button 60 is confirmed earlier than when the CPU 41 reduces the size of the detection area toward a position away from the predetermined area in the button area 60A in response to detection of the user's finger 3 over the predetermined area. In addition, when the predetermined area is an area located at the center of the button area 60A, the scan button area 70A, which is adjacent to the button area 60A, is less likely to be incorrectly selected due to an unintentional movement of the user's finger 3, compared to when the predetermined area is set in the vicinity of the boundary of the button area 60A. In other words, the occurrence of erroneous operations on objects in the home screen 50 may be prevented or reduced.

Second Exemplary Embodiment

The first exemplary embodiment describes an example in which in response to detection of the user's finger 3 over the first area of an object, the second area is displayed in the first area and in which in response to detection of the user's finger 3 over the second area for a predetermined amount of time after the user's finger 3 has moved to above the second area, the selection operation of the object is confirmed. A second exemplary embodiment describes an example in which in response to detection of the user's finger 3 over the first area of an object, the second area is displayed in or outside the first area and in which in response to the movement of the user's finger 3 to above the second area, the selection operation of the object is confirmed.

An example of a contactless operation of the image processing apparatus 10 according to the second exemplary embodiment will be described with reference to FIGS. 16 to 22. The configuration of the image processing apparatus 10 is the same as that of the image processing apparatus 10 according to the first exemplary embodiment, except for the processing of the contactless operation.

In the present exemplary embodiment, as in the first exemplary embodiment, in response to detection of the user's finger 3 over a first area included in the home screen 50 and displaying an object, a second area is displayed to confirm an operation assigned to the object corresponding to the position at which the user's finger 3 is detected.

Figure 16:
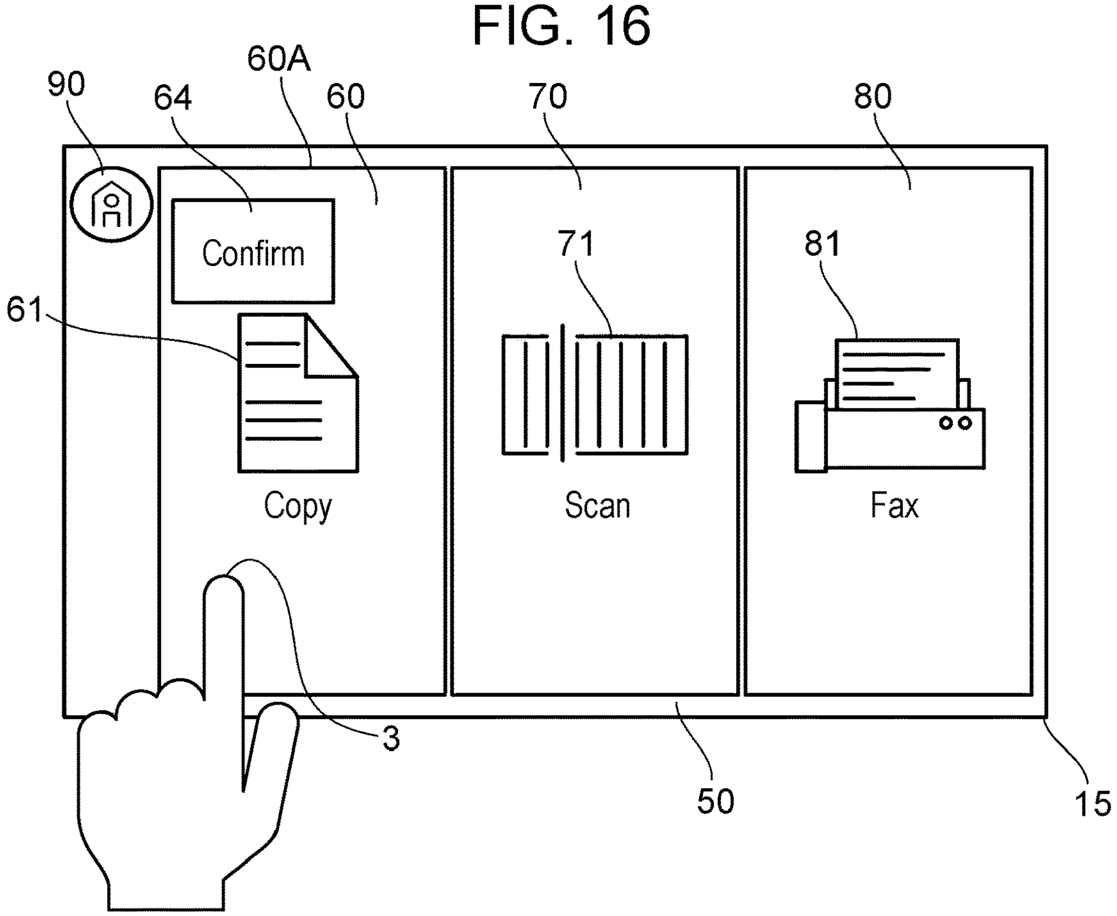
FIG. 16 is a front view of the home screen, illustrating a state in which a confirmation area, which is an example of the second area, is displayed in the first area of the object in response to detection of the user's finger.
Figure 17:
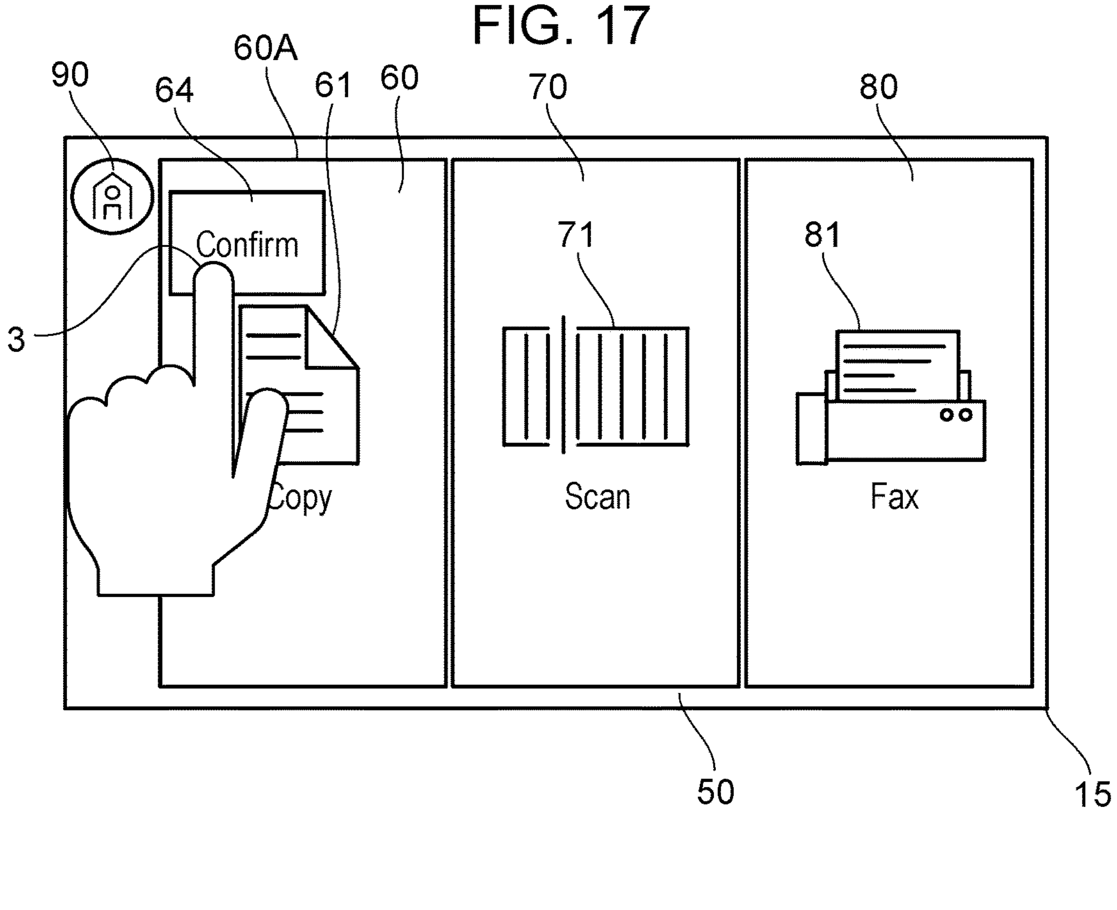
FIG. 17 is a view corresponding to FIG. 16, illustrating a state in which the user's finger has moved to above the confirmation area.

As illustrated in FIG. 16, in response to detection of the user's finger 3 over the copy button area 60A, the CPU 41 causes a confirmation area 64 to be displayed as an example of a second area at a position that is located above the copy button area 60A and that does not include the detected finger 3. For example, the CPU 41 may cause the confirmation area 64 to be displayed above the copy button area 60A at a position away from the detected position of the user's finger 3. As illustrated in FIG. 17, in response to detection of the user's finger 3 over the confirmation area 64, the CPU 41 may confirm the operation to be performed on the "Copy" button 60. The time taken to confirm the operation by using the confirmation area 64 is much shorter than that by using the detection area 62. Thus, the user holds the user's finger 3 over the confirmation area 64 for a short amount of time, thereby confirming the selection operation of the corresponding object.

Figure 18:
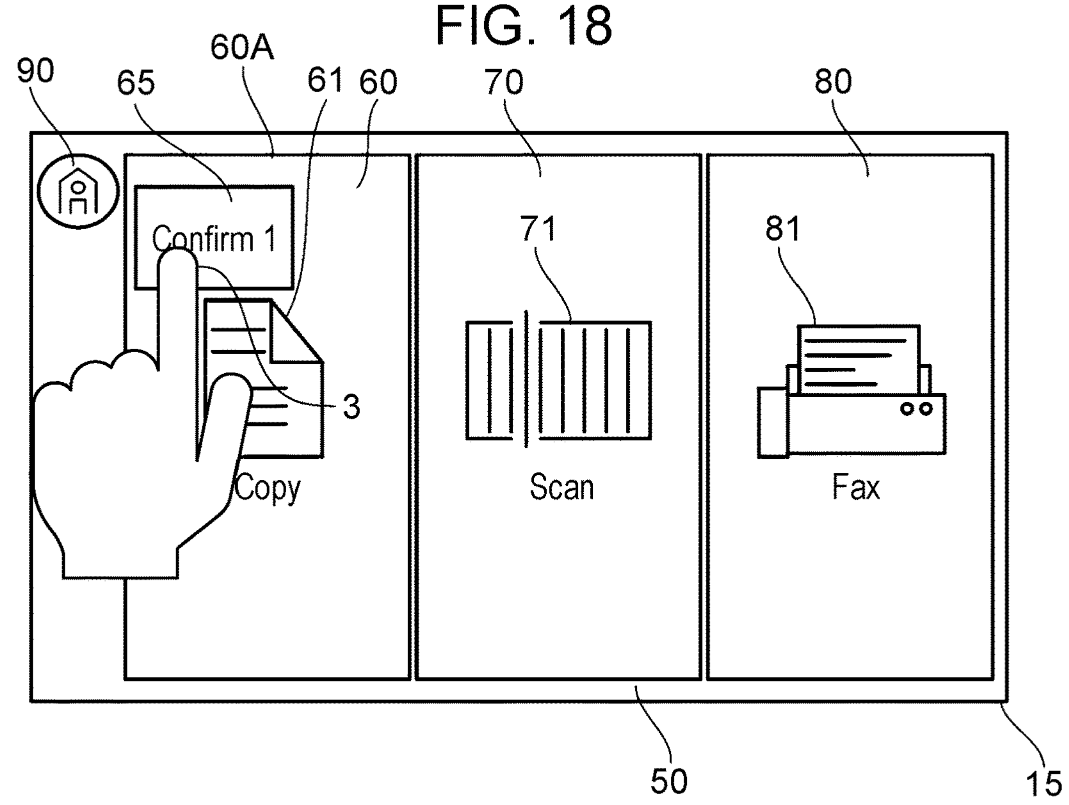
FIG. 18 is a front view of the home screen, illustrating a state in which a first confirmation area, which is an example of the second area, is displayed in the first area of the object in response to detection of the user's finger.
Figure 19:
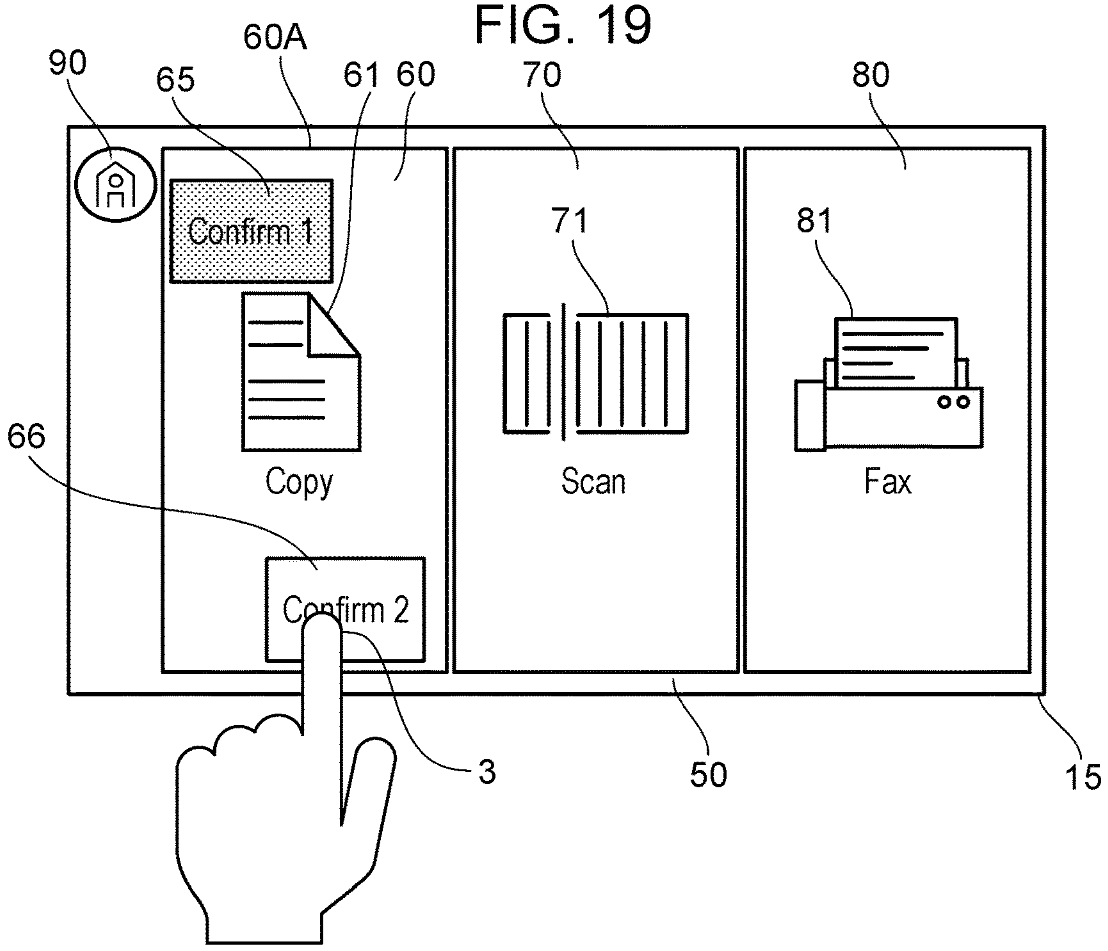
FIG. 19 is a view corresponding to FIG. 18, illustrating a state in which the user's finger has moved from the first confirmation area to above a second confirmation area.

As illustrated in FIG. 18, the CPU 41 may cause a first confirmation area 65 to be displayed in the copy button area 60A in response to detection of the user's finger 3 over the button area 60A. As illustrated in FIG. 19, the CPU 41 may cause a second confirmation area 66 to be displayed in the button area 60A in response to detection of the user's finger 3 over the first confirmation area 65. Further, in response to detection of the user's finger 3 over the first confirmation area 65, the CPU 41 may change the color of the first confirmation area 65. Instead of the color, the shape of the first confirmation area 65 may be changed, or a frame may be displayed around the first confirmation area 65 as long as the user can recognize that the first confirmation area 65 has been selected. The first confirmation area 65 and the second confirmation area 66 are displayed to be spaced apart from each other in the button area 60A. The first confirmation area 65 and the second confirmation area 66 are examples of a second area in the present exemplary embodiment. Alternatively, in response to detection of the user's finger 3 over the button area 60A, the CPU 41 may cause the first confirmation area 65 and the second confirmation area 66 to be simultaneously displayed in the button area 60A. In this case, the CPU 41 may confirm the operation to be performed on the "Copy" button 60, in response to detection of the user's finger 3 over the second confirmation area 66 after detection of the user's finger 3 over the first confirmation area 65.

Figure 20:
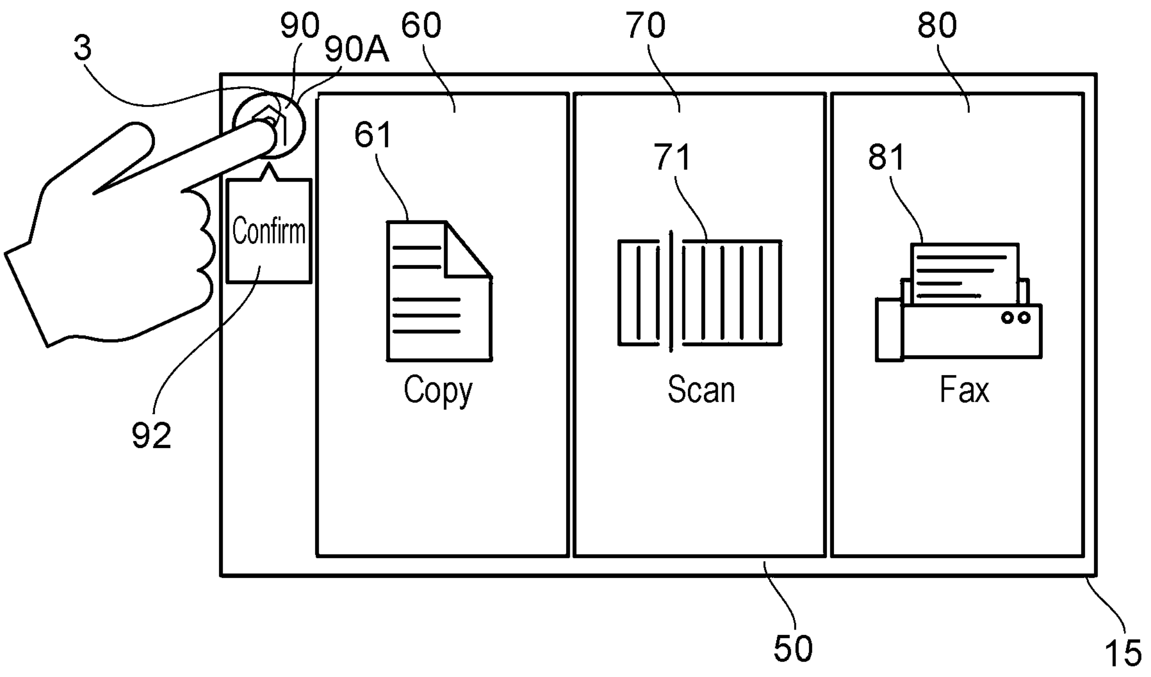
FIG. 20 is a front view of the home screen, illustrating a state in which a confirmation area, which is an example of the second area, is displayed at a position away from the first area of the object in response to detection of the user's finger.
Figure 21:
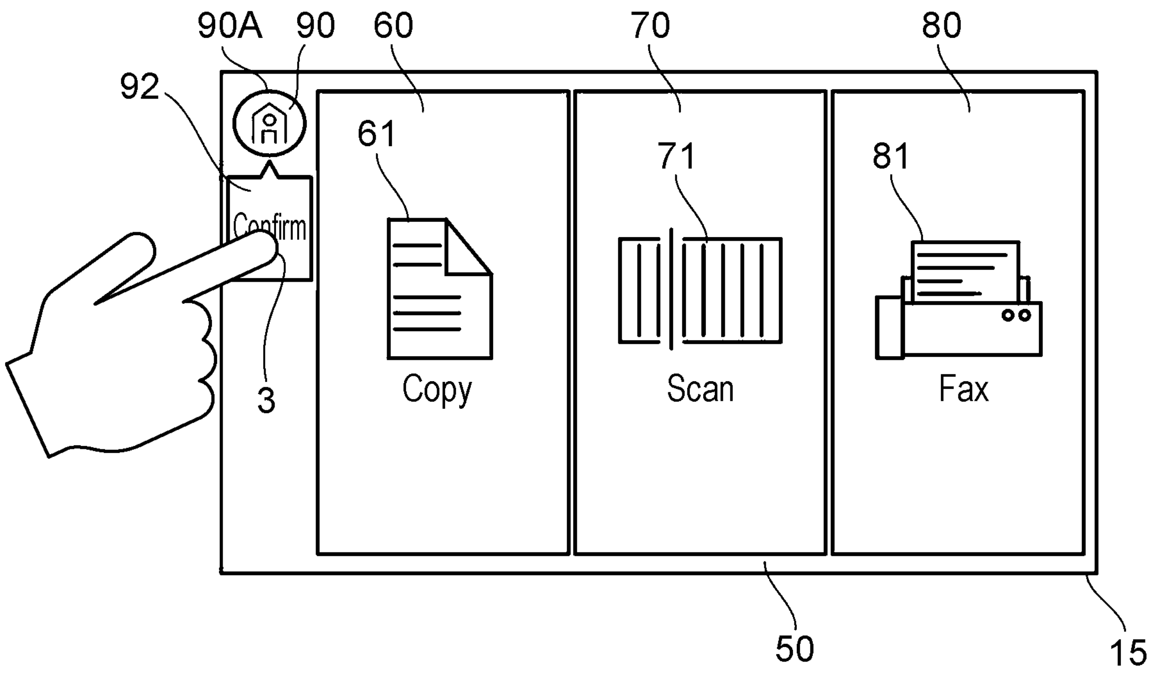
FIG. 21 is a view corresponding to FIG. 20, illustrating a state in which the user's finger has moved to above the confirmation area.

As illustrated in FIG. 20, in response to detection of the user's finger 3 over the home button 90 on the home screen 50, the CPU 41 may cause a confirmation area 92 serving as a second area to be displayed outside the button area 90A, which displays the home button 90. In the example illustrated in FIG. 20, since the home button 90 is present near the edge of the home screen 50 and space is difficult to secure, an empty area immediately below the home button 90 is set as the confirmation area 92. As illustrated in FIG. 21, in response to detection of the user's finger 3 over the confirmation area 92, the CPU 41 may confirm the operation assigned to the home button 90.

Figure 22:
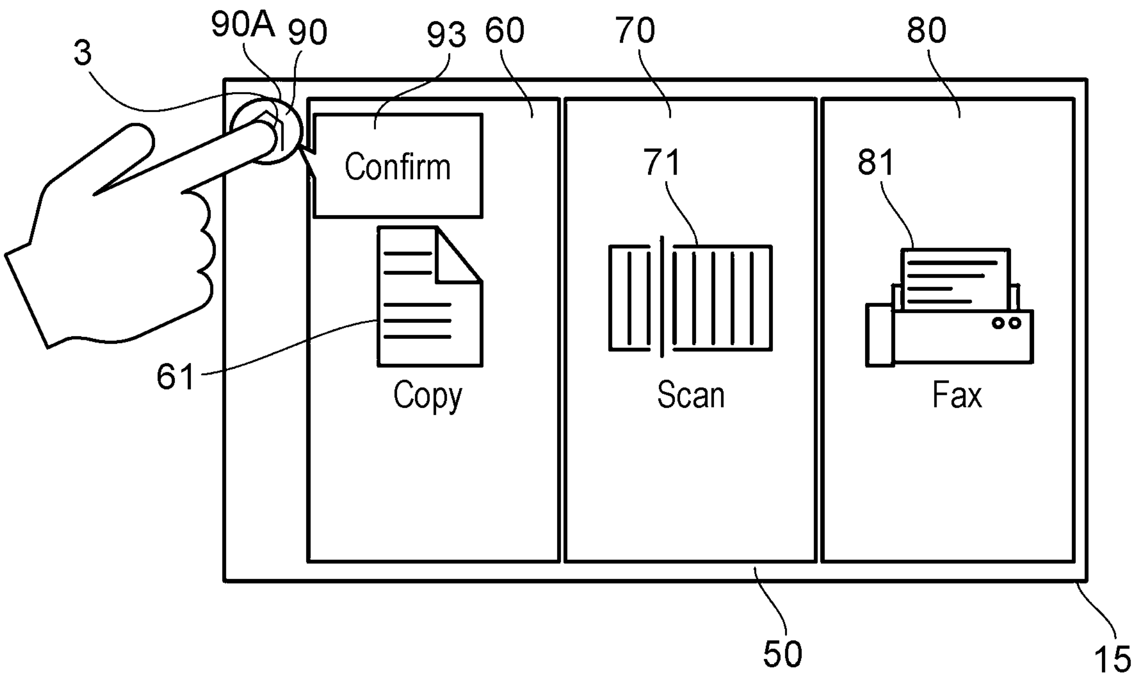
FIG. 22 is a front view of the home screen, illustrating a state in which a confirmation area, which is an example of the second area, is displayed at a position away from the first area of the object in response to detection of the user's finger.
Figure 23:
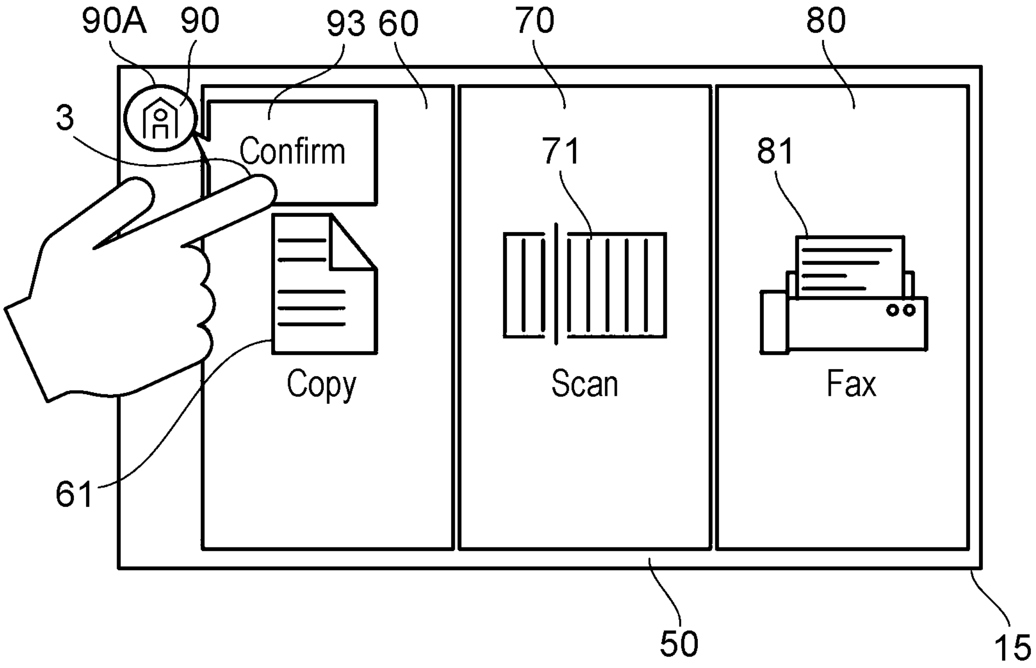
FIG. 23 is a view corresponding to FIG. 22, illustrating a state in which the user's finger has moved to above the confirmation area.

Alternatively, as illustrated in FIG. 22, in response to detection of the user's finger 3 over the home button 90 on the home screen 50, the CPU 41 may cause a confirmation area 93 serving as a second area to be displayed outside the button area 90A, which displays the home button 90. In the example illustrated in FIG. 22, since the home button 90 is present near the edge of the home screen 50 and space is difficult to secure, part of the button area 60A of the "Copy" button 60 is set as the confirmation area 93. As illustrated in FIG. 23, in response to detection of the user's finger 3 over the confirmation area 93, the CPU 41 may confirm the operation assigned to the home button 90.

Next, the operation of the image processing apparatus 10 according to the second exemplary embodiment will be described with reference to FIG. 30.

Figure 30:
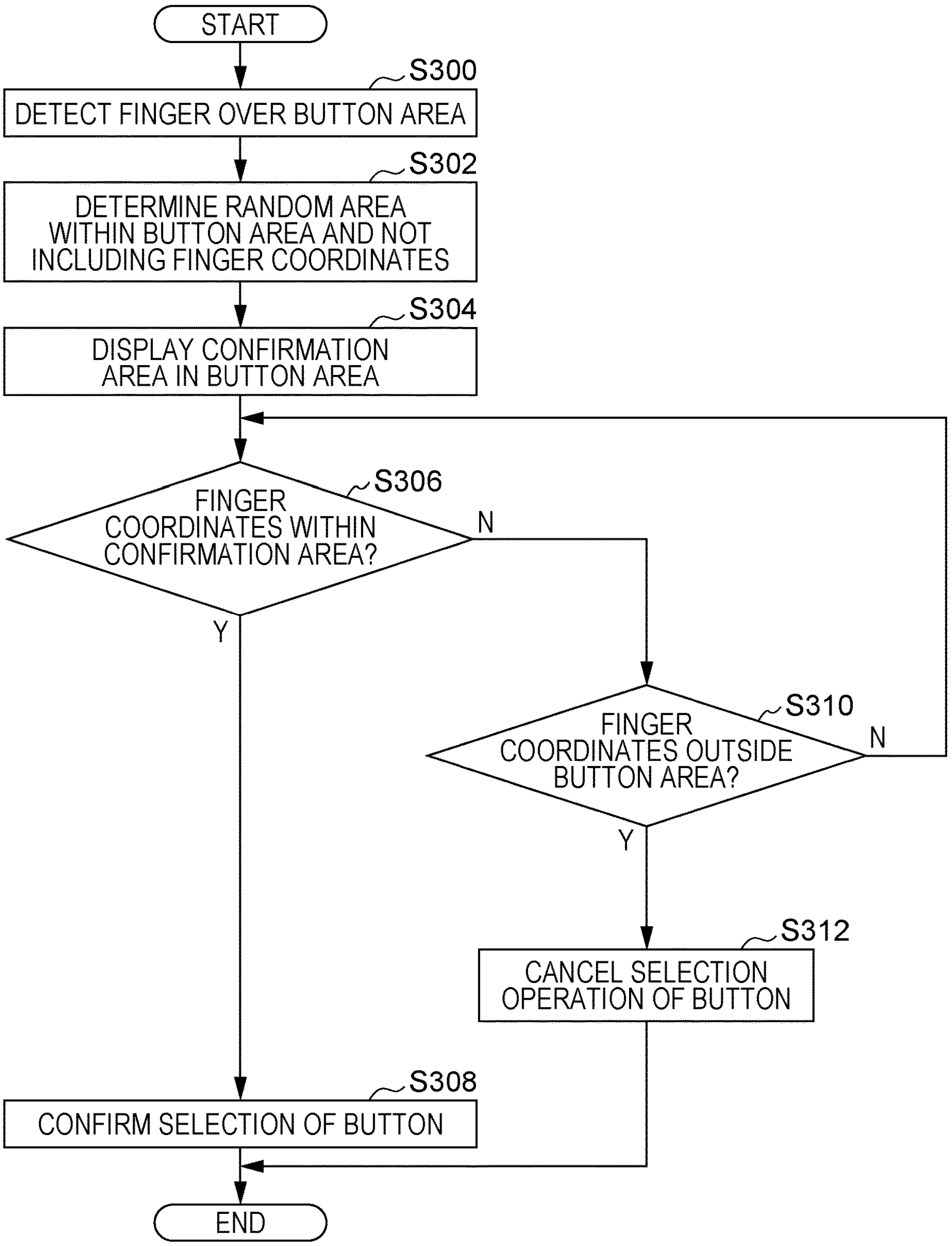
FIG. 30 is a flowchart illustrating a modification of the process for contactless operation based on the information processing program according to the exemplary embodiment.

FIG. 30 is a flowchart illustrating an example of a process based on an information processing program according to the present exemplary embodiment.

First, in response to an instruction to execute a contactless input through the operation panel 15, the CPU 41 activates the information processing program and executes the steps described below.

Referring to FIG. 30, in step S300, the CPU 41 detects the user's finger 3, which is a target with which a contactless operation is to be performed, over the button area 60A. Then, the CPU 41 proceeds to step S302.

In step S302, the CPU 41 determines a random area that is located in the button area 60A and that does not include the detected position of the user's finger 3 (also referred to as the coordinates of the user's finger 3). After that, the CPU 41 proceeds to step S304.

In step S304, the CPU 41 causes the confirmation area 64 to be displayed in the button area 60A. After that, the CPU 41 proceeds to step S306.

In step S306, the CPU 41 determines whether the detected position of the user's finger 3 is within the confirmation area 64. If the detected position of the user's finger 3 is within the confirmation area 64, the CPU 41 proceeds to step S308. On the other hand, if the coordinates of the user's finger 3 are outside the confirmation area 64, the CPU 41 proceeds to step S310.

In step S308, the CPU 41 confirms the selection of the "Copy" button 60. After that, the CPU 41 proceeds to the next process corresponding to the selection of the "Copy" button 60.

In step S310, the CPU 41 determines whether the detected position of the user's finger 3 is outside the button area 60A. If the detected position of the user's finger 3 is within the button area 60A, the CPU 41 proceeds (returns) to step S306. On the other hand, if the detected position of the user's finger 3 is outside the button area 60A, the CPU 41 proceeds to step S312.

In step S312, the CPU 41 cancels the selection operation of the "Copy" button 60.

In the information processing program according to the exemplary embodiment described above, a confirmation area is displayed in the button area 60A; however, the present disclosure is not limited to this configuration. As in a modification of the information process program according to the second exemplary embodiment illustrated in FIG. 31, a confirmation area may be displayed outside the button area 90A (see FIGS. 20 and 21).

Figure 31:
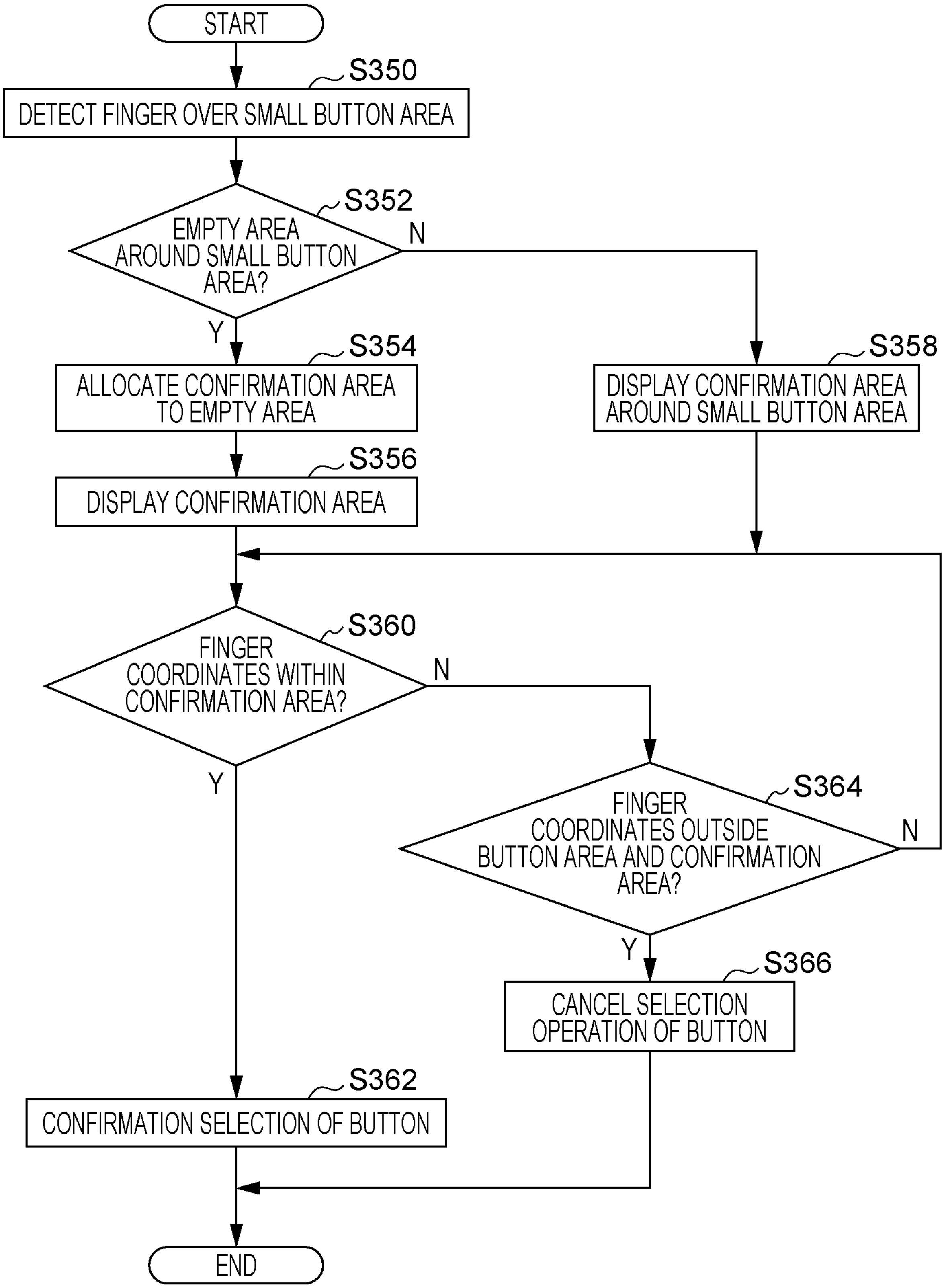
FIG. 31 is a flowchart illustrating a modification of the process for contactless operation based on the information processing program according to the exemplary embodiment.

Referring to FIG. 31, in step S350, the CPU 41 detects the user's finger 3, which is a target with which a contactless operation is to be performed, over the button area 90A. Then, the CPU 41 proceeds to step S352.

In step S352, the CPU 41 determines whether an empty area is present around the button area 90A. If an empty area is present around the button area 90A, the CPU 41 proceeds to step S354. If no empty area is present around the button area 90A, the CPU 41 proceeds to step S358.

In step S354, the CPU 41 allocates a confirmation area to the empty area around the button area 90A. After that, the CPU 41 proceeds to step S356.

In step S356, the CPU 41 causes the confirmation area 92 to be displayed around the button area 90A (see FIG. 20).

In step S358, the CPU 41 causes the confirmation area 93 to be displayed around the button area 90A (see FIG. 22).

In step S360, the CPU 41 determines whether the detected position of the user's finger 3 is within the confirmation area 92. If the detected position of the user's finger 3 is within the confirmation area 92, the CPU 41 proceeds to step S362. On the other hand, if the detected position of the user's finger 3 is outside the confirmation area 92, the CPU 41 proceeds to step S364.

In step S362, the CPU 41 confirms the selection of the home button 90. After that, the CPU 41 proceeds to the next process corresponding to the selection of the home button 90.

In step S364, the CPU 41 determines whether the detected position of the user's finger 3 is outside the button area 90A and outside the confirmation area 92. If the detected position of the user's finger 3 is outside the button area 90A and outside the confirmation area 92, the CPU 41 proceeds to step S366. On the other hand, if the detected position of the user's finger 3 is within the button area 90A or within the confirmation area 92, the CPU 41 proceeds (returns) to step S360.

In step S366, the CPU 41 cancels the selection operation of the home button 90.

In the second exemplary embodiment, in response to the CPU 41 detecting the user's finger 3 over the button area 60A, the confirmation area 64 is displayed in the button area 60A. The operation to be performed on the "Copy" button 60 is confirmed in response to the user holding the finger 3 over the confirmation area 64. As described above, the operation to be performed on an object is confirmed early, making the apparatus easy to use.

When a plurality of confirmation areas are displayed, the selection operation of an object is confirmed by the intention of the user, making it easy to prevent or reduce the occurrence of erroneous operations on the object.

Third Exemplary Embodiment

A third exemplary embodiment is the same as the first exemplary embodiment, except that in response to detection of the user's finger 3 over the first area of an object, the first area is expanded and then the second area is displayed in the first area.

Next, an example of a contactless operation of the image processing apparatus 10 according to the third exemplary embodiment will be described with reference to FIGS. 24 and 25. The configuration of the image processing apparatus 10 is the same as that of the image processing apparatus 10 according to the first exemplary embodiment, except for the processing of the contactless operation.

In the present exemplary embodiment, in response to detection of the user's finger 3 over a first area included in the home screen 50 and displaying an object, the first area is expanded and then a second area is displayed in the first area to confirm an operation assigned to the object corresponding to the position at which the user's finger 3 is detected.

Figure 24:
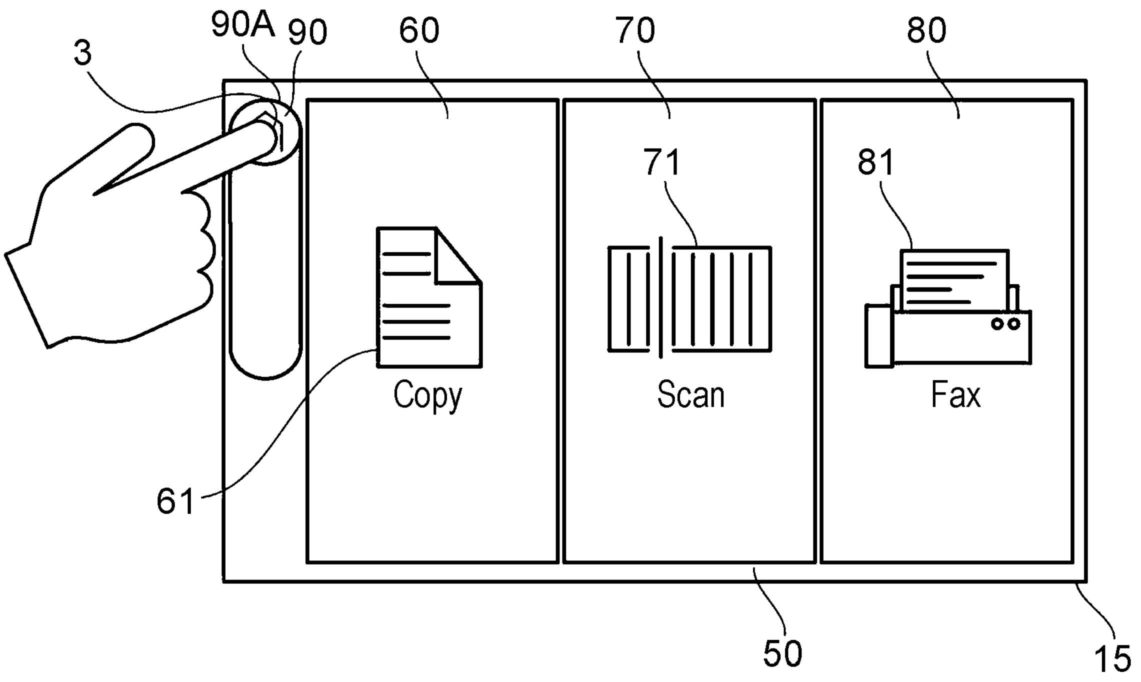
FIG. 24 is a front view of the home screen, illustrating a state in which the first area of the object is expanded in response to detection of the user's finger.
Figure 25:
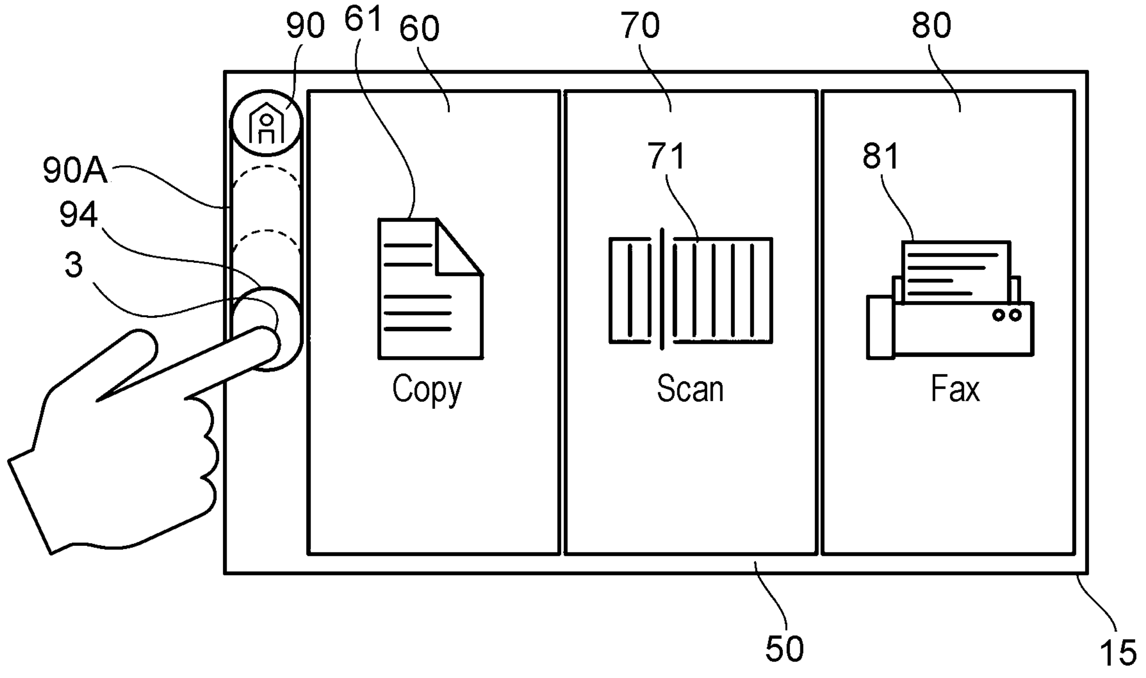
FIG. 25 is a view corresponding to FIG. 24, illustrating a state in which the user's finger has moved to above a detection area that is an example of a second area included in the expanded first area.

As illustrated in FIGS. 24 and 25, in response to detection of the user's finger 3 over the button area 90A, the CPU 41 enlarges the button area 90A, causes a detection area 94 to be displayed in the enlarged button area 90A, and reduces the size of the detection area 94 to a predetermined size as the user's finger 3 approaches the detection area 94. As illustrated in FIG. 25, the detection area 94 is reduced in size so as to be away from the home button 90. When the total detection time during which the user's finger 3 is detected in the detection area 94 exceeds the selection confirmation time, the CPU 41 may confirm the operation to be performed on the home button 90.

Next, the operation of the image processing apparatus 10 according to the third exemplary embodiment will be described with reference to FIG. 32.

Figure 32:
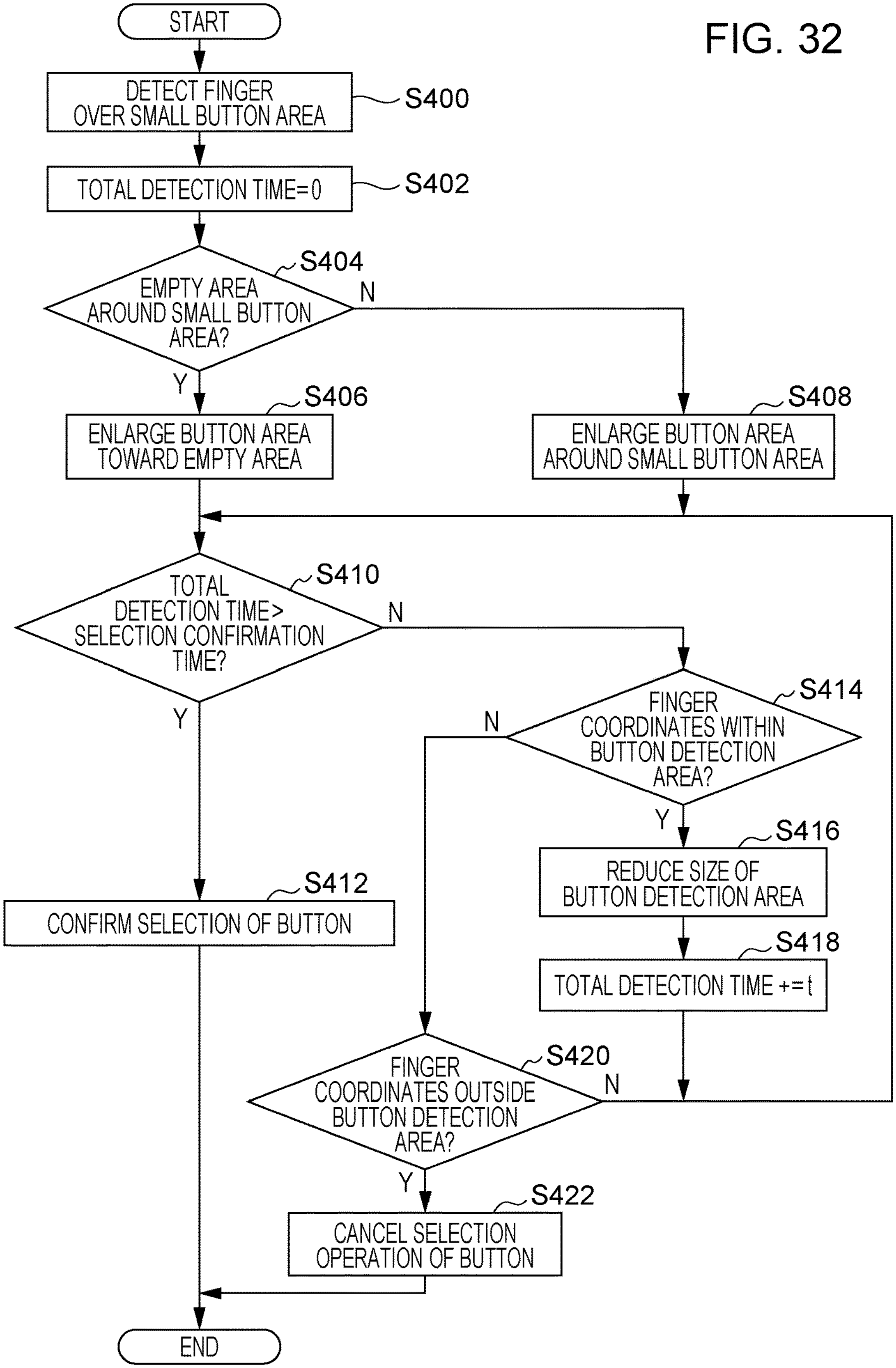
FIG. 32 is a flowchart illustrating a modification of the process for contactless operation based on the information processing program according to the exemplary embodiment.

FIG. 32 is a flowchart illustrating an example of a process based on an information processing program according to the present exemplary embodiment.

First, in response to an instruction to execute a contactless input through the operation panel 15, the CPU 41 activates the information processing program and executes the steps described below.

Referring to FIG. 32, in step S400, the CPU 41 detects the user's finger 3, which is a target with which a contactless operation is to be performed, over the button area 90A. Then, the CPU 41 proceeds to step S402.

In step S402, the total detection time of the user's finger 3 for confirming the selection operation of the home button 90, which is an example of an object, is set to zero. After that, the CPU 41 proceeds to step S404.

In step S404, the CPU 41 determines whether an empty area is present around the button area 90A. If an empty area is present around the button area 90A, the CPU 41 proceeds to step S406. If no empty area is present around the button area 90A, the CPU 41 proceeds to step S408.

In step S406, the CPU 41 expands the button area 90A toward the empty area (see FIG. 24). After that, the CPU 41 proceeds to step S410.

In step S408, the CPU 41 expands the button area 90A around the button area 90A.

In step S410, the CPU 41 compares the total detection time with the selection confirmation time. If the total detection time exceeds the selection confirmation time, the CPU 41 proceeds to step S412. On the other hand, if the total detection time is less than or equal to the selection confirmation time, the CPU 41 proceeds to step S414.

In step S412, the CPU 41 confirms the selection of the home button 90. After that, the CPU 41 proceeds to the next process corresponding to the selection of the home button 90.

In step S414, the CPU 41 determines whether the detected position of the user's finger 3 (also referred to as the coordinates of the user's finger 3) is within the detection area 94 of the home button 90. If the detected position of the user's finger 3 is within the detection area 94, the CPU 41 proceeds to step S416. On the other hand, if the detected position of the user's finger 3 is outside the detection area 94, the CPU 41 proceeds to step S420.

In step S416, the CPU 41 reduces the size of the detection area 94 in a predetermined direction. After reducing the size of the detection area 94 to a predetermined size, the CPU 41 proceeds to step S418.

In step S418, the CPU 41 adds the time during which the user's finger 3 is detected over the detection area 94 to the total detection time. Then, the CPU 41 proceeds to step S410.

In step S420, the CPU 41 determines whether the detected position of the user's finger 3 is outside the button area 90A. If the detected position of the user's finger 3 is outside the button area 90A, the CPU 41 proceeds to step S422. On the other hand, if the detected position of the user's finger 3 is within the button area 90A, the CPU 41 proceeds (returns) to step S410.

In step S422, the CPU 41 cancels the selection operation of the home button 90.

In the third exemplary embodiment, for example, if the first area of an object is small, the first area of the object is expanded. This may prevent or reduce the occurrence of erroneous operations on the object. Further, since the second area is displayed in the expanded first area, the occurrence of unintended erroneous operations by the user may be prevented or reduced.

Figure 33:
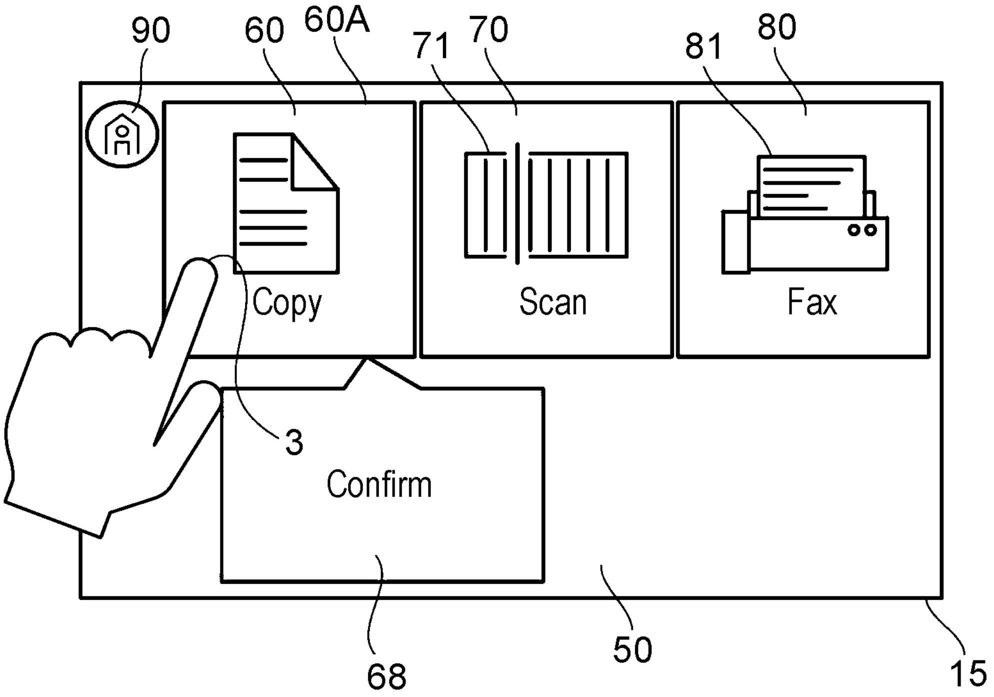
FIG. 33 is a front view of the home screen, illustrating a state in which the confirmation area is displayed outside the first area of the object in response to detection of the user's finger.

In the first to third exemplary embodiments described above, the first area of an object is set to be smaller than the second area; however, the present disclosure is not limited to this configuration. The first area of an object may be the same as or larger than the second area. In an example illustrated in FIG. 33, in response to detection of the user's finger 3 over the button area 60A of the "Copy" button 60, the CPU 41 causes a confirmation area 68 having a size greater than or equal to the button area 60A to be displayed at a position away from the button area 60A. Displaying the confirmation area 68 makes it easy to confirm the selection operation of the confirmation area 68.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

An image processing apparatus has been described as an example of an information processing apparatus according to some exemplary embodiments. Exemplary embodiments may provide a program for causing a computer to execute the functions of the information processing apparatus. Exemplary embodiments may provide a non-transitory computer-readable storage medium storing such a program.

In addition, the configuration of an information processing apparatus described in the exemplary embodiments described above is an example and may be changed depending on the situation without departing from the scope of the present disclosure.

Additionally, a process flow of a program described in the exemplary embodiments described above is also an example, and any unnecessary step may be deleted, a new step may be added, or the processing order may be changed without departing from the scope of the present disclosure.

In the exemplary embodiments described above, a program is executed to implement processing according to an exemplary embodiment by a software configuration using a computer, by way of example but not limitation. The exemplary embodiments may be implemented by, for example, a hardware configuration or a combination of a hardware configuration and a software configuration.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing system comprising:

a processor configured to:

when an object in a screen is to be operated with a target in a contactless manner, in response to detection of the target over a first area included in the screen and displaying the object, cause a second area having a different size from the first area to be displayed to confirm an operation to be performed on the object.

(((2)))

The information processing system according to (((1))), wherein the processor is configured to cause the second area to be displayed in the first area.

(((3)))

The information processing system according to (((2))), wherein the processor is configured to, in response to detection of the target over the first area, cause the second area to be displayed at a position that is located above the first area and that does not include the detected target.

(((4)))

The information processing system according to (((2))) or (((3))), wherein the processor is configured to reduce a size of the second area to a predetermined size as the target approaches the second area in the screen.

(((5)))

The information processing system according to (((2))) or (((3))), wherein the processor is configured to, in response to detection of the target over a predetermined area in the first area, reduce a size of the second area to a predetermined size centered on the predetermined area as the target approaches the second area in the screen.

(((6)))

The information processing system according to (((5))), wherein the predetermined area is an area located at a center of the first area.

(((7)))

The information processing system according to any one of (((1))) to (((6))), wherein the processor is configured to confirm the operation to be performed on the object, in response to detection of the target over the second area for a predetermined amount of time.

(((8)))

The information processing system according to any one of (((1))) to (((4))), wherein the processor is configured to confirm the operation to be performed on the object, in response to detection of the target over the second area.

(((9)))

The information processing system according to (((1))), wherein the second area includes a first confirmation area and a second confirmation area, the first confirmation area and the second confirmation area being displayed to be spaced apart from each other, and the processor is configured to cause the first confirmation area to be displayed in response to detection of the target over the first area, and cause the second confirmation area to be displayed in response to detection of the target over the first confirmation area.

(((10)))

The information processing system according to (((1))), wherein the processor is configured to, in response to detection of the target over the first area, enlarge the first area, cause the second area to be displayed in the enlarged first area, and reduce a size of the second area to a predetermined size as the target approaches the second area in the screen.

(((11)))

The information processing system according to any one of (((1))) to (((10))), wherein the processor is configured to cancel the operation to be performed on the object, in response to detection of the target outside the first area.

(((12)))

The information processing system according to (((1))), wherein the processor is configured to cause the second area to be displayed outside the first area.

(((13)))

An information processing system comprising:

a processor configured to:

when an object in a screen is to be operated with a target in a contactless manner, in response to detection of the target over a first area included in the screen and displaying the object, cause a second area to be displayed at a position away from the first area to confirm an operation to be performed on the object.

(((14)))

An information processing program for causing a computer to execute:

when an object in a screen is to be operated with a target in a contactless manner, in response to detection of the target over a first area included in the screen and displaying the object, causing a second area having a different size from the first area to be displayed to confirm an operation to be performed on the object.

What is claimed is:

1. An information processing system comprising:

a processor configured to:

when an object in a screen is to be operated with a target in a contactless manner, in response to detection of the target over a first area included in the screen and displaying the object, cause a second area having a different size from the first area to be displayed to confirm an operation to be performed on the object, wherein the second area includes a first confirmation area and a second confirmation area, the first confirmation area and the second confirmation area being displayed to be spaced apart from each other, and the processor is configured to cause the first confirmation area to be displayed in response to detection of the target over the first area, and cause the second confirmation area to be displayed in response to detection of the target over the first confirmation area.

2. The information processing system according to claim 1, wherein the processor is configured to cause the second area to be displayed in the first area.

3. The information processing system according to claim 2, wherein the processor is configured to, in response to detection of the target over the first area, cause the second area to be displayed at a position that is located above the first area and that does not include the detected target.

4. The information processing system according to claim 2, wherein the processor is configured to reduce a size of the second area to a predetermined size as the target approaches the second area in the screen.

5. The information processing system according to claim 2, wherein the processor is configured to, in response to detection of the target over a predetermined area in the first area, reduce a size of the second area to a predetermined size centered on the predetermined area as the target approaches the second area in the screen.

6. The information processing system according to claim 5, wherein the predetermined area is an area located at a center of the first area.

7. The information processing system according to claim 1, wherein the processor is configured to confirm the operation to be performed on the object, in response to detection of the target over the second area for a predetermined amount of time.

8. The information processing system according to claim 1, wherein the processor is configured to confirm the operation to be performed on the object, in response to detection of the target over the second area.

9. The information processing system according to claim 1, wherein the processor is configured to, in response to detection of the target over the first area, enlarge the first area, cause the second area to be displayed in the enlarged first area, and reduce a size of the second area to a predetermined size as the target approaches the second area.

10. The information processing system according to claim 1, wherein the processor is configured to cancel the operation to be performed on the object, in response to detection of the target outside the first area.

11. The information processing system according to claim 1, wherein the processor is configured to cause the second area to be displayed outside the first area.

12. An information processing system comprising:

a processor configured to:

when an object in a screen is to be operated with a target in a contactless manner, in response to detection of the target over a first area included in the screen and displaying the object, cause a second area to be displayed at a position away from the first area to confirm an operation to be performed on the object, wherein the second area includes a first confirmation area and a second confirmation area, the first confirmation area and the second confirmation area being displayed to be spaced apart from each other, and the processor is configured to cause the first confirmation area to be displayed in response to detection of the target over the first area, and cause the second confirmation area to be displayed in response to detection of the target over the first confirmation area.

13. A non-transitory computer readable medium storing a program causing a computer to execute a process for information processing, the process comprising:

when an object in a screen is to be operated with a target in a contactless manner, in response to detection of the target over a first area included in the screen and displaying the object, causing a second area having a different size from the first area to be displayed to confirm an operation to be performed on the object, wherein the second area includes a first confirmation area and a second confirmation area, the first confirmation area and the second confirmation area being displayed to be spaced apart from each other, and the process further comprises causing the first confirmation area to be displayed in response to detection of the target over the first area, and causing the second confirmation area to be displayed in response to detection of the target over the first confirmation area.

* * * * *